(12) United States Patent
Forney et al.

(10) Patent No.: US 7,973,794 B2
(45) Date of Patent: ***Jul. 5, 2011

(54) METHOD AND SYSTEM FOR ANIMATING GRAPHICAL USER INTERFACE ELEMENTS VIA A MANUFACTURING/PROCESS CONTROL PORTAL SERVER

(75) Inventors: Paul W. Forney, Laguna Hills, CA (US); Rashesh Mody, San Clemente, CA (US); Chau Bich, Irvine, CA (US); David Neff, Mission Viejo, CA (US); Todd Miller, Lake Forest, CA (US); Kimson Q. Nguyen, Costa Mesa, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,583

(22) Filed: Jun. 1, 2010

(65) Prior Publication Data

US 2010/0238181 A1 Sep. 23, 2010

Related U.S. Application Data

(63) Continuation of application No. 09/954,425, filed on Sep. 14, 2001, now Pat. No. 7,728,838.

(60) Provisional application No. 60/232,733, filed on Sep. 15, 2000.

(51) Int. Cl.
*G06T 13/00* (2006.01)
*G06T 15/70* (2006.01)
*G05B 11/01* (2006.01)
*G06F 15/16* (2006.01)

(52) U.S. Cl. ............... 345/474; 700/27; 709/219
(58) Field of Classification Search .......... 345/474; 700/27; 709/219
See application file for complete search history.

(56) References Cited

U.S. PATENT DOCUMENTS 5,768,133 A  6/1998 Chen et al.
(Continued)

FOREIGN PATENT DOCUMENTS

WO  WO 98/52144 A1  11/1998

OTHER PUBLICATIONS

InfoPower Systems et al: "The Corporate Portal Solution," Internet Citation. [On-Line]; Oct. 15, 1999; URL:http://www.enteract.com/{ipsi/aportal.htm> [retrieved on Mar. 26, 2002].

(Continued)

*Primary Examiner* — Ryan R Yang
(74) *Attorney, Agent, or Firm* — Leydig, Voit & Mayer Ltd

(57) ABSTRACT

A method and system are disclosed for rendering animated graphics on a browser client based upon a stream of runtime data from a manufacturing/process control system. The graphics animation is based upon an animated graphic display object specification and runtime data from a portal server affecting an appearance trait of the animated graphic display object. The client browser receives an animated graphics description from the portal server specifying an animation behavior for an identified graphical display object. The client creates a data exchange connection between an animated display object, corresponding to the animated graphics description, and a source of runtime data from the portal server affecting display of the animated display object. Thereafter, the client applies runtime data received from the source of runtime data to the animated display object to render an animated graphic display object.

27 Claims, 8 Drawing Sheets

U.S. PATENT DOCUMENTS

| | | | |
|---|---|---|---|
| 5,802,255 | A | 9/1998 | Hughes et al. |
| 5,812,394 | A | 9/1998 | Lewis et al. |
| 5,815,683 | A | 9/1998 | Vogler |
| 5,860,068 | A | 1/1999 | Cook |
| 5,894,310 | A | 4/1999 | Arsenault et al. |
| 5,918,054 | A | 6/1999 | Jury et al. |
| 5,940,504 | A | 8/1999 | Griswold |
| 5,970,490 | A | 10/1999 | Morgenstern |
| 5,983,190 | A | 11/1999 | Trower et al. |
| 6,012,098 | A | 1/2000 | Bayeh et al. |
| 6,029,145 | A | 2/2000 | Barritz et al. |
| 6,038,668 | A | 3/2000 | Chipman et al. |
| 6,058,395 | A | 5/2000 | Buzaglo et al. |
| 6,061,603 | A | 5/2000 | Papadopoulos et al. |
| 6,073,055 | A | 6/2000 | Jahn et al. |
| 6,098,068 | A | 8/2000 | Brown |
| 6,119,149 | A | 9/2000 | Notani |
| 6,121,963 | A | 9/2000 | Ange |
| 6,167,383 | A | 12/2000 | Henson |
| 6,182,094 | B1 | 1/2001 | Humpleman et al. |
| 6,182,125 | B1 | 1/2001 | Borella et al. |
| 6,198,479 | B1 | 3/2001 | Humpleman et al. |
| 6,313,835 | B1 * | 11/2001 | Gever et al. ............... 715/846 |
| 6,362,817 | B1 | 3/2002 | Powers et al. |
| 6,449,634 | B1 | 9/2002 | Capiel |
| 6,480,191 | B1 | 11/2002 | Balabanovic |
| 6,505,242 | B2 | 1/2003 | Holland et al. |
| 6,603,488 | B2 | 8/2003 | Humpleman et al. |
| 6,687,737 | B2 | 2/2004 | Landsman et al. |
| 6,741,242 | B1 * | 5/2004 | Itoh et al. ............... 345/419 |
| 6,785,659 | B1 | 8/2004 | Landsman et al. |
| 7,728,838 | B2 * | 6/2010 | Forney et al. ............... 345/474 |
| 2001/0032216 | A1 | 10/2001 | Duxbury |
| 2001/0038392 | A1 | 11/2001 | Humpleman et al. |
| 2001/0044736 | A1 | 11/2001 | Jacobs et al. |
| 2002/0008703 | A1 * | 1/2002 | Merrill et al. ............... 345/473 |
| 2002/0015042 | A1 | 2/2002 | Robotham et al. |
| 2002/0033844 | A1 | 3/2002 | Levy et al. |
| 2002/0036639 | A1 | 3/2002 | Bourges-Sevenier |
| 2002/0089530 | A1 | 7/2002 | Markel |
| 2002/0120518 | A1 | 8/2002 | Carney et al. |
| 2003/0090712 | A1 | 5/2003 | Lenz et al. |

OTHER PUBLICATIONS

John et al.:, "XNAMI—An extensible XML-based paradigm for network and application management instrumentation" IEEE International Conference on Networks. ICON. Proceedings of ICON; Sep. 28, 1999; pp. 115-124.

International Search Report, dated Dec. 10, 2002, in corresponding PCT Application No. PCT/US01/28982.

International Search Report in corresponding PCT Application No. PCT/US01/29310, dated Dec. 26, 2001.

Hansen et al. "A Performance Tracking Methodology and Decision Support Mode," IEEE, 2000, pp. 256-262.

International Search Report in corresponding PCT Application No. PCT/US01/28956, dated Nov. 21, 2001.

Supplemental European Search Report, Oct. 19, 2006.

* cited by examiner

FIG. 5

```
<DataBinding ID="data_binding_table">
    <BindingExpression
        TargetElement = "rect1"
        BehaviorMethod = "RotateAngle"
        TagExpression = "$Second"
        IsIxpression = False>
    </BindingExpression>

<BindingExpression
        TargetElement = "rect2"
        BehaviorMethod = "Blink"
        TagExpression = "TankLevel"
        IsIxpression = False>
    </BindingExpression>

<BindingExpression
        TargetElement = "rect2"
        BehaviorMethod = "VertPercentFill"
        TagExpression = "(ReactorTemp/ReactorLevel)* 100"
        IsIxpression = True
        ExprTags = "ReactorTemp,ReactorLevel">
    </BindingExpression>
</DataBinding>
```

FIG. 7a

| Behavior | Data In - Behavior Method | Write Back |
|---|---|---|
| Touch Links | | |
| 500 — User Inputs – Discrete | UserInputDiscrete(discrete) | Yes |
| 502 — User Inputs – Analog | UserInputAnalog(Float) | Yes |
| 504 — User Inputs – String | UserInputString(String) | Yes |
| 506 — Sliders – Vertical | SliderVertical(Float) | Yes |
| 508 — Slider – Horizontal | SliderHorizontal(Float) | Yes |
| 510 — Touch Pushbuttons – Discrete | --- | Yes |
| 512 — Touch Pushbuttons – Action (Script) | --- | |
| 514 — Touch Pushbuttons – Show Window | --- | --- |
| 516 — Touch Pushbuttons – Hide Window | --- | --- |
| 518 — Line Color – Discrete | LineColorDiscrete(discrete) | --- |
| 520 — Line Color – Analog | LineColorAnalog(float) | --- |
| 522 — Line Color - Discrete Alarm | LineColorDiscreteAlarm(discrete) | --- |
| 524 — Line Color - Analog Alarm | LineColorAnalogAlarm_LoLoStatus(discrete) LineColorAnalogAlarm_LoStatus(discrete) LineColorAnalogAlarm_HiStatus(discrete) LineColorAnalogAlarm_HiHiStatus(discrete) LineColorAnalogAlarm_MajorDevStatus(discrete) LineColorAnalogAlarm_MinorDevStatus(discrete) LineColorAnalogAlarm_ROCStatus(discrete | --- |

FIG. 7b

| | | | |
|---|---|---|---|
| 526 — | Text Color – Discrete | TextColorDiscrete(discrete) | --- |
| 528 — | Text Color – Analog | TextColorAnalog(float) | --- |
| 530 — | Text Color - Discrete Alarm | TextColorDiscreteAlarm(discrete) | --- |
| 532 | Text Color - Analog Alarm | TextColorAnalogAlarm_LoLoStatus(discrete)<br><br>TextColorAnalogAlarm_LoStatus(discrete)<br><br>TextColorAnalogAlarm_HiStatus(discrete)<br>TextColorAnalogAlarm_HiHiStatus(discrete)<br>TextColorAnalogAlarm_MajorDevStatus(discrete)<br>TextColorAnalogAlarm_MinorDevStatus(discrete)<br>TextColorAnalogAlarm_ROCStatus(discrete) | --- |
| 534 — | Fill Color – Discrete | FillColorDiscrete(discrete) | --- |
| 536 — | Fill Color – Analog | FillColorAnalog(float) | --- |
| 538 — | Fill Color - Discrete Alarm | FillColorDiscreteAlarm(discrete) | --- |
| 540 — | Fill Color - Analog Alarm | FillColorAnalogAlarm_LoLoStatus(discrete)<br><br>FillColorAnalogAlarm_LoStatus(discrete)<br><br>FillColorAnalogAlarm_HiStatus(discrete)<br>FillColorAnalogAlarm_HiHiStatus(discrete)<br>FillColorAnalogAlarm_MajorDevStatus(discrete)<br>FillColorAnalogAlarm_MinorDevStatus(discrete)<br>FillColorAnalogAlarm_ROCStatus(discrete) | --- |
| 542 — | Object Size – Height | ObjectSizeHeight(int) | --- |
| 544 — | Object Size – Width | ObjectSizeWidth(int) | --- |
| 546 — | Location – Vertical | LocationVertical(integer) | --- |
| 548 — | Location – Horizontal | LocationHorizontal(integer) | --- |
| 550 — | Miscellaneous – Visible | Visibility(discrete) | --- |
| 552 — | Miscellaneous – Blink | Blink(discrete) | --- |
| 554 — | Miscellaneous - Orientation | Orientation(integer) | --- |
| 556 — | Miscellaneous – Disable | Disabled(discrete) | --- |
| 558 — | Percent Fill – Vertical | PercentFillVertical(float) | --- |
| 560 — | Percent Fill – Horizontal | PercentFillHorizontal(float) | --- |
| 562 — | Value Display – Discrete | ValueDisplayDiscrete(discrete) | --- |
| 564 — | Value Display – Analog | ValueDisplayAnalog(float) | --- |
| 566 — | Value Display – String | ValueDisplayString(string) | --- |
| 568 — | Listvox Window Control | WindowControlValue(Variant) | Yes |
| 570 — | Combobox Window Control | WindowControlValue(Variant) | Yes |
| 572 — | Checkbox Window Control | WindowControlValue(Variant) | Yes |
| 574 — | Textbox Window Control | WindowControlValue(Variant) | Yes |
| 576 — | Radiobuttons Window Control | WindowControlValue(Variant) | Yes |

METHOD AND SYSTEM FOR ANIMATING GRAPHICAL USER INTERFACE ELEMENTS VIA A MANUFACTURING/PROCESS CONTROL PORTAL SERVER

CROSS REFERENCE TO RELATED APPLICATION

This application claims priority of Forney et al. U.S. patent application Ser. No. 09/954,425, filed on Sep. 14, 2001, entitled "Method And System For Animating Graphical User Interface Elements Via A Manufacturing/Process Control Portal Server" which claims priority benefit of Forney et al. U.S. provisional application Ser. No. 60/232,733 filed on Sep. 15, 2000, entitled "Extensible Manufacturing Portal Server." The contents of both applications are expressly incorporated herein by reference in their entirety including the contents and teachings of any references contained therein.

FIELD OF THE INVENTION

The present invention generally relates to the field of computer graphics user interfaces. More particularly, the present invention relates to methods for graphically displaying plant floor information. The present invention concerns methods and systems for animating graphical user interface display elements in response to changing sensed conditions within a manufacturing/process control system as evidenced by data received via a network connected to the graphics animation system (e.g., Internet/intranet) portal server.

BACKGROUND OF THE INVENTION

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables, execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Various data input/output servers, including for example data access servers, facilitate placing process control data (both reading and writing) within reach of a variety of higher-level monitor/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the process control databases and field devices by data access servers for further processing/use by the process control system. For example, the data access servers provide the retrieved information to a variety of client applications providing high-level control and monitoring (both human and computerized) services.

In systems containing data input/output servers, the high-level control and monitoring applications rely upon the proper operation of the servers to provide the data upon which such applications rely for decision-making. The information includes real-time process variable values, alarms, etc. Data input/output servers are implemented in a number of forms. In some systems, a single data access server operates upon a single node on a computer network from which higher level supervisory control is implemented. In other systems, multiple data access servers are located upon a local area network, and the multiple data access servers are accessed by supervisory-level applications running on other nodes on a local control network. In yet other systems, access to process control information/resources is achieved via temporary sessions established via a wide area network link. One particular example is data access provided via an Internet/intranet portal server.

A portal site is an Internet/intranet site that provides access to a variety of information from potentially many sources. Portal sites, referred to as vertical portals, are sometimes designed to provide access to a particular type of information. Portal servers handle user traffic at portal sites and provide user access over the Internet/intranet to the variety of data sources exposed by the portal site. Such users generally access the portal site via remote computers executing general browser software such as the well known MICROSOFT INTERNET EXPLORER. Through the browsers the users access the data sources exposed by the portal site/server.

Portal servers provide a wide variety of services. One example of such services is to "content accessibility" that facilitates connectivity to information sources and/or content providers. Content includes: online documents, libraries, databases, and government documents. Such content can be located over a wide geographic area, but are connected via a network structure (e.g., the Internet). Another example of portal services is a search engine that enables users to locate particular information within a vast amount of available content. A portal server often maintains an index to enhance performance of searches. Another portal service is visualization of available services (e.g., displaying various features available to users). An aspect to visualization is displaying documents and information retrieved at the request of a user. Yet another portal server function is providing access to plant information for users from many parts of the world via the World Wide Web in the users' language. Such access includes both domestic and foreign users. A last example of a portal function is support for personalization. A portal is used by many different people for many purposes. Portal servers store user profile information to enhance user experiences.

An advantage of a portal server approach to accessing process control information/resources is the ability of users to gain access from virtually any location in the world. Such access enables specialists (both human and programmed) to obtain access to and provide supervisory services without having to be physically present on the manufacturing/industrial plant. Such accessibility can save an enterprise considerable time and costs, and avoid travel delays. Wide area network access of the type supported by a portal server also enables centralized, coordinated and highly integrated control of an enterprise spread over a relatively wide geographic area. Notwithstanding the significant benefits of providing Web access to a process control network, significant challenges are faced with regard to obtaining and displaying potentially large amounts of real-time manufacturing/process control information in a meaningful way for a user. The incorporation of portal servers into process control systems has greatly increased the reachability of process control/plant floor status information.

However, a challenge remains in portal server design for manufacturing/real-time process control applications to present the data, now available over the Worldwide Web in a manner that is useful and meaningful to the recipient. To this end, the portal must provide the data in near real-time, and the data must also be presented in a form such that potentially large amounts of status information can be taken in by the recipient to make quick decisions. Finally, the information must be readily processed by thin, browser-based clients.

SUMMARY OF THE INVENTION

The present invention offers a new display manufacturing/real-time process information in a manner that is readily digested by humans such as process control engineers and plant supervisors. In particular, a method and system are disclosed for rendering animated graphics on a browser client based upon a stream of runtime data from a manufacturing/process control system. The graphics animation is based upon an animated graphic display object specification and runtime data from a portal server affecting an appearance trait of the animated graphic display object. The client browser receives an animated graphics description from the portal server specifying an animation behavior for an identified graphical display object. The client creates a data exchange connection between an animated display object, corresponding to the animated graphics description, and a source of runtime data from the portal server affecting display of the animated display object. Thereafter, the client applies runtime data received from the source of runtime data to the animated display object to render an animated graphic display object.

In a particular embodiment of the invention, the graphics display behavior of an animated graphical display object is rendered in XML thereby providing a platform independent code base upon which the graphical animation components execute.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 5 is an exemplary simple binding table structure for representation of animation behaviors on graphical display objects;

FIGS. 7a and 7b are a chart summarizing a set of graphics animation behaviors supported by a system embodying the present invention.

DETAILED DESCRIPTION OF AN ILLUSTRATIVE EMBODIMENT

Figure 1:
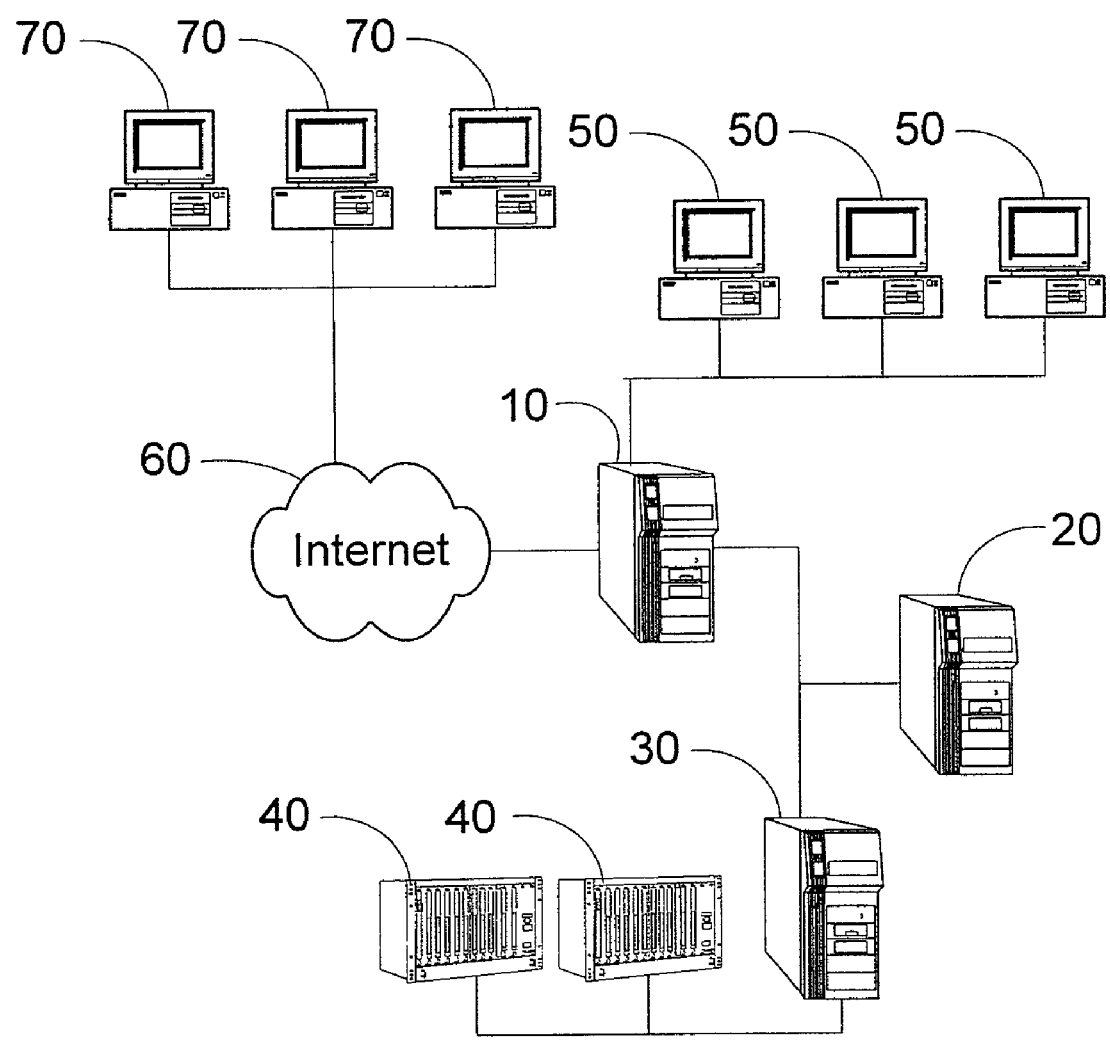
FIG. 1 is a schematic drawing depicting an exemplary process control environment for the present invention wherein a manufacturing/process control network includes a portal server that provides a variety of portal services including displays of manufacturing processes enhanced by animated graphics to browser clients.

An exemplary manufacturing/process control information rendering system incorporating the present invention provides real-time animation of graphical interface objects representing the status of components within an automated process control system. The information rendering system facilitates visualization, publishing and management components for a manufacturing/process control portal accessed from a broad range of locations via an appropriately augmented browser.

The present invention is, by way of example, carried out using XML/XSL and VML programming languages. In the exemplary embodiment of the present invention, XML (extensible markup language) and XSL (extensible stylesheet language) are used to describe data transmitted from a portal server to a browser over the Internet or a corporate intranet and how the data should be displayed by the browser. VML (Vector Markup Language) is an open text-based language for describing renderable vector-graphics elements and primitives to a browser (e.g., Internet Explorer). The VML generates a set of instructions to a browser rendering engine to paint graphics based upon the input XML/XSL instructions.

The animated graphics are designed for satisfactory performance on Internet-connected browser based clients. In view of the potential bandwidth limitations of Internet connections, the graphics information is transmitted in a compact, encoded manner. While typical animated graphics comprise large files that are relatively slow to download, an embodiment of the present invention converts graphics windows and associated animation into extensible markup language (XML) definitions, applying an extensible style language (XSL) translation, and rendering vector markup language (VML) on the fly at the client (browser) machine. Structures are maintained on the client machine that attach animated graphics to data sources that control their animation. Client-side rendering of animated graphics from the above-described XML input substantially reduces the amount of information transmitted between the manufacturing/process control information portal and remotely connected browser clients.

The process of creating and displaying such animated graphics comprises, by way of example, the following general steps. First, process graphics are created having real time data sources and information connecting the real time data to an animation behavior of the graphics. A utility program converts the graphical images to an XML format and publishes them to a portal server coupled to a manufacturing/process control system. When a client-browser connects to the portal server, XML and XSL components are downloaded to the client. The client applies VML technology to the downloaded XML and XSL to render initial images and to make connections to sources of live manufacturing/process control data that will drive animation of the graphical images. Thereafter, the client-browser receives real-time process data relayed from the plant floor system by the portal server and applies the data to the XML and XSL graphical display object definitions to render animation that reflects the changing conditions/status of the manufacturing/process control system.

The above-described real-time data driven graphics animation scheme embodies a number of attractive features. One such feature is the ease with which graphical images can be changed by interface developers through addition and/or modification of XML/XSL descriptions. Another attractive feature is the ability to render real-time graphics animation for a manufacturing/process control system by means of data transmitted over wide-area network links having limited bandwidth capabilities. The present invention enables connection, via a client-browser program, to a portal server that provides access to real-time process data. The real-time process data is connected to particular animated graphical display objects and drives animation behaviors for the displayed objects. The rendering of the actual graphical display image data occurs at the client-browser. Thereby greatly reducing the volume of data flowing over the connection between the client-browser and the portal server. Yet another feature of the present invention is relatively small web page size which facilitate fast initial animated page load times.

Turning to FIG. 1, an exemplary portal server arrangement is schematically depicted. A portal server 10 provides portal services to a manufacturing/process control environment. That environment consists of a database server 20 and a data access server 30. The data access server 30 in turn connects to process control equipment 40. The portal server 10 provides its services to browser clients at locally connected workstations 50 and, via the Internet 60 or a proprietary network, at remote work stations 70.

Figure 2:
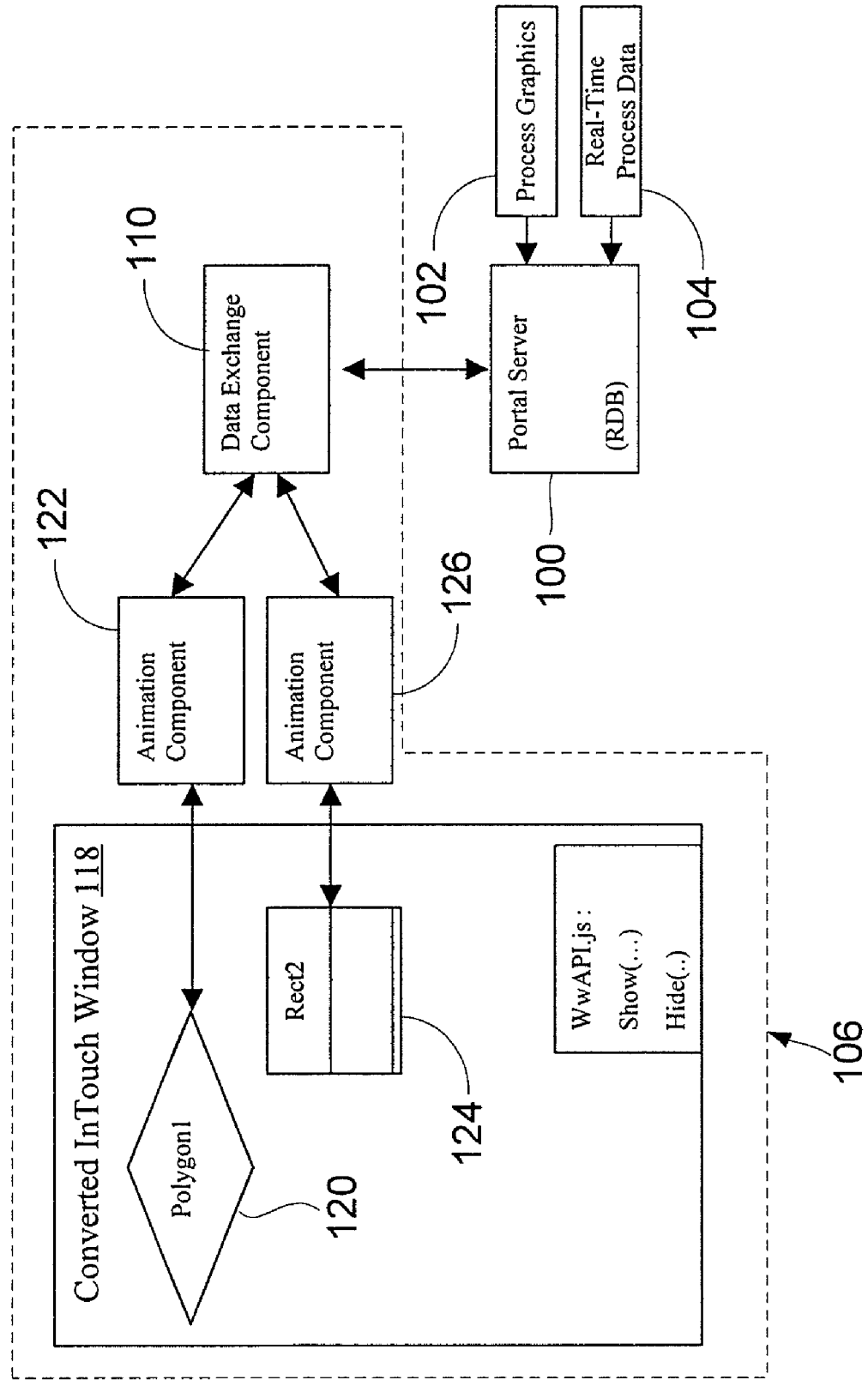
FIG. 2 is a schematic drawing depicting primary components of a client-side graphics animation engine that generates animated graphics images from a set of image items including an animation behavior definition and a stream of data for animating the set of image items provided by an Internet server.

Turning to FIG. 2, an exemplary portal server to browser client animated graphics rendering scheme is depicted. A portal server 100 receives and provides process graphics 102 (the underlying XML/XSL files defining an animated graphical display) as well as real time data 104 representing process parameters. The real time data 104 drives the animation of the process graphics 102 according to behaviors defined in the process graphics 102. Both the process graphics 102 and the real time data are discussed further herein below.

The portal server 100 stores the process graphics 102 within a file system in anticipation of requests from browser clients. A browser client 106 issues a request for access to a particular graphical process display that includes animated display objects. An example of such a display is a set of storage tanks and mixing bins in an automated baking/food preparation facility. The browser client 106 receives the above mentioned process graphics 102 and thereafter receives a stream of real-time data updates from the portal server based upon updates to the real time process data 104.

A data exchange component 110 of the browser client 106 is responsible for receiving requested animated displays and maintaining a set of structures linking input real-time update information to the displayed animated objects to drive the animation of the displayed objects. In an embodiment of the invention, is a client side COM (common object model) object that interacts with a client-side runtime database (RDB) component and a set of associated user interface animation objects. The runtime database component notifies the data exchange component 110 about changes to tags associated with the user interface animation objects. The data exchange 110 then notifies the animation objects of the changes. Alternatively, animation objects receive changes based upon user input (e.g., selecting a graphical user interface button). Data entered by the user is passed through the data exchange component back to the runtime database component. The runtime database component then updates the appropriate tag on the data server with the new value.

Animated display code generated for an animated display window will contain information binding data from a runtime database component to an animation behaviors component of a display item. The data exchange component 110 executes the binding (or association) of the runtime data to the display item. To accomplish this task, the data exchange component 110 parses XML tables in an HTML file specifying data sources bound to particular animation behaviors. The data exchange uses this information to initialize internal structures (described herein below) that manage a process for notifying the runtime database and the animated display items in response to value changes tied to an animation display behavior. Display behaviors are bound directly to tags or, alternatively they can also be bound to expressions. The data exchange component 110 is responsible for recalculating expression values if any tag in an expression changes. Furthermore, the data exchange component 110 provides a visual indicator that a connection is still active, even if values are not changing. An example of such an indicator is a status bar with a simple progress indicator that updates every second.

Each animated display object has a corresponding animation component. In the basic example of a converted display window 118, polygon 120 is linked to animation component 122. A rectangle 124 is linked to animation component 126. Each of the animation components 122 and 126 is linked to a display item maintained by the data exchange component for purposes of receiving display update information corresponding to real-time data received by the data exchange component 110 from the portal server 100.

In an embodiment of the present invention the animation components 122 and 126 perform a role of supplying graphics animation commands (e.g., mimic InTouch animation and touch link behavior) within the context of a browser (e.g., Internet Explorer) web page. The animation component receive graphic display item tag updates from the data exchange component. As mentioned previously above, the data exchange component 110 receives user initiated data changes to the animated graphical interface display items.

Each animation component acts as an intermediary between an HTML/VML rendering object (representing some graphical display object) and the data exchange component 110. The data exchange component 110 is notified, during initialization of a view containing animated display objects, with regard to associations between tag(s) and animation behaviors on particular graphical display objects. However, the data exchange component 110 is not capable of submitting the actual interface commands to execute animation behaviors on the display objects based on a tag changes. Therefore, the data exchange component 110 calls a method defined by the display object itself to carry out the desired animation behavior. Animation components expose the animation methods of animated display objects. Thus, when the data exchange component 110 receives notification that a tag value has changed, the data exchange component 110 calls an animation component established for the associated display object to invoke an animation behavior on the display object based upon the new tag value.

The following generally describes the creation and attachment of animation components to graphic displayed objects. Animation components are COM objects that implement the interfaces of a binary Internet Explorer HTML Component (HTC). Animation components also implement an event object to receive user input notifications. The animation components also implement an interface supporting script safety with Internet Explorer.

Each of the animation components is attached to a graphic display element (VML or HTML) by first being loaded as a standard ActiveX object using the <OBJECT> tag, then being referenced in a style named "wwAnim". The wwAnim style is assigned to a graphical display element's class attribute. The wwAnim style, enables a graphical display element to have animation behavior capabilities, but the wwAnim style reference does not indicate to a graphical interface element the actual animation behaviors incorporated into the element, or the effect of tag changes upon the graphic display element.

The following describes how an animation behavior is bound and initiated with a graphical display element. First, the animation component is instantiated as a standard ActiveX object within the web page as shown below.

```
...
<BODY>
  <OBJECT   ID        = wwAnimation
            CLASSID   = "clsid:D84C9541-D993-11D3-802C-00A0C9723245"
            CODEBASE  = "/SuiteVoyager/_library/bin/SuiteVoyager.cab">
  </OBJECT>
...
```

The above code section does not actually create an instance or me animation component. Rather, the code section creates an Animation Factory object used by the Internet Explorer browser to create an instance of an animation component. If an animation component is not already installed/registered on the web browser machine it will be automatically downloaded from the same web server that the web page came from. This is the purpose of the <OBJECT> element's "CODEBASE" attribute.

Next, the Animation Factory object is referenced within the wwanim style.

```
<HTML>
...
<style>
  v\:*       { behavior:url(#default#VML); }
  .wwanim    { behavior:url(#default#VML) url(#wwAnimation); }
  ...
</style>
</head>
...
<BODY>
```

Next, the wwanim style is assigned to each and every graphic display element's class attribute that is to have one or more animation behaviors. This assignment will implicitly make a request to the created Animation Factory object for an instance of an animation behavior object and will bind that animation object to the UI element.

Note that the animation object is bound to a VML <group> element that contains the graphic display element. This is depicted in the example below. The animation object is not only aware of this arrangement but expects it.

```
<v:group
    class   = 'wwanim'
    id      = 'rect1'
    ....
    <v:rect
        id  = 'rect1_object'
        ...
    </v:rect>
</v:group>
```

The first thing that every instance of an animation component object does during initialization is check it's associated element (the group element) for the "ww_behaviorlist" attribute to determine behavior(s) for which it is responsible when a new tag value comes in. For each animation behavior of a graphical display element, there is a separate <behavior> child-element containing the specific behavior attributes that the animation object uses to determine a course of action when a new tag data value is received by the browser. In the example below, the <behavior> element specifies a discrete pushbutton touch link animation behavior that is only for input. Therefore, the animation component will not allow the user to change the value. However, if the animation component is associated with a textbox (which in this instance is not the case), then the on and off messages, "good" and "bad," are displayed depending on the current value of the associated discrete tag.

Associating a tag or tag expression with an associated graphic display element animation behavior is now depicted with reference to another example.

```
<v:group
    class              = 'wwanim'
    id                 = 'rect1'
    ww_behaviorlist    = "ww_touchlink"
    ww_touchlink       = 'rect1_touchlink'
    <v:rect
        id             = 'rect1_object'
    <Behavior
        id             = 'rect1_touchlink'
        ww_type        = 'wwtouchlink'
        ww_actionType  = 'UserInputDiscrete'
        ww_VirtKey     = '65'
        ww_cKeyFlags   = '0'
        ww_msgToUser   = 'Here is my message'
        ww_onMessage   = 'good'
        ww_offMessage  = 'bad'
```

```
        ww_setPrompt    = 'Open'
        ww_resetPrompt  = 'Close'
        ww_inputOnly    = 'true'>
    </Behavior>
  </v:rect>
</v:group> <!-- rect1 -->
```

The final step for carrying out a defined animation on a graphic display element is to inform the animation component when an associated tag value changes. The mechanism for carrying out such notification is the data exchange component 110 that is described further herein below. Associations are created between animation components and tags by the data exchange component 110 by reading a data binding XML table to determine every behavior/tag expression combination as well as graphical display object elements that are to receive the tag change notifications. The following is an example of a binding expression within a binding table structure. A binding expression table contains multiple binding expressions tying various animation behaviors of display elements to tags.

```
<BindingExpression
    TargetElement       = "rect1"
    BehaviorMethod      = "UserInputDiscrete"
    TagExpressionOrg    = "Discrete_tag"
    TagExpression       = "var1"
    ReadWrite               = "true"
    IsExpression        = "false">
    <ExpressionTags>
        <Tag
            Item        = "discrete_tag"
            VarName     = "var1"
            ConnID      = "1">
        </Tag>
    </ExpressionTags>
</BindingExpression>
```

To facilitate animating graphics, XSL transformation is performed. When XSL transformation of graphical display elements occurs, two actions occur in the generated HTML output that pertains to an animation component. First, for each graphic display element that XSL outputs (e.g., an HTML/VML element) it must also output a separate <behavior> child element for each behavior bound to the graphic display object. The XSL code is aware of the behaviors a graphic display object incorporates because the behaviors are defined in a Window XML file transformed by the XSL code. Each <behavior> child element contains specific attributes that the animation component uses to determine how to process a tag value change. An exemplary set of animation behavior types is described below.

Second, XSL transformation adds entries to a "data binding table" XML table. In addition to specifying the target element and the tag expression used by the data exchange component, it specifies the correct method on the target display element to achieve the correct behavior when its associated tag expression changes. There is at least one method for each type of animation behavior. In the few cases related to animations based on tag alarms there are multiple methods to support the alarm animation.

Figure 3:
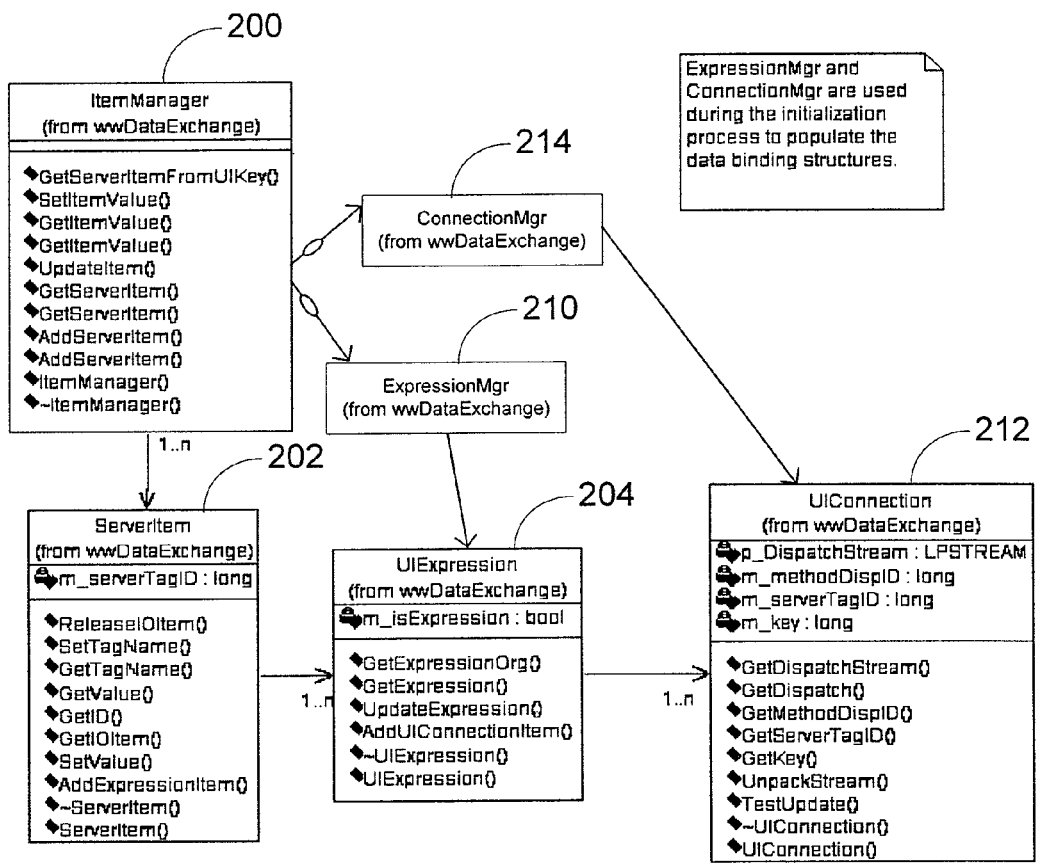
FIG. 3 depicts a set of mapping components and their associated structures maintained by a data exchange component for animated graphical display objects in accordance with an embodiment of the present invention.

Having described an exemplary animated graphics architecture embodying the present invention as well as an example of creating and binding animation components to associated tags and display elements, attention is now directed to FIG. 3 that depicts a set of internal components associated with the data exchange component 110. The data exchange component 110 creates an ItemManagerMap to maintain a list of ServerItem objects. Each animated display object tag that is to be monitored will have a ServerItem object in the ItemManagerMap. Another structure, called ExpressionMap, is created by the data exchange 110 to maintain a set of UIExpression objects. The UIExpression objects are responsible for resolving an expression down to its value and passing it on to an appropriate UIConnection object. (see sections below for details on how this mechanism works) Finally, the data exchange component 110 creates a ConnectionMap to maintain the above-mentioned UIConnection objects. Each user interface point of notification will have a UIConnection object in the ExpressionMap.

With reference now to FIG. 3, an ItemManager 200 provides an interface to a behavior class of the data exchange component 110. The ItemManager 200 performs data-binding during initialization of the data exchange component for a user interface page containing animation behavior tied to runtime data. The ItemManager 200 wraps the details of populating data-binding structures within the data exchange component 110 as well as notifying the system of value changes received by runtime database handlers via the portal server 100. The ItemManager 200 holds a mapping of (n) ServerItem objects 202.

Each ServerItem object holds information for a corresponding tag connection to the runtime database component of the real-time graphics animation system. Each of the ServerItem objects 202 holds a list of one or more pointers to elements of a set of UI Expression objects 204. Each of the UIExpression objects 204 represents an expression that has the particular ServerItem tag. The ServerItem objects 202, in an embodiment of the present invention, have a direct link (e.g., a pointer) to a runtime database input/output interface. The direct link enables the ServerItem objects 202 to directly notify the runtime database of changes to animation behavior. The ServerItem objects 202 are notified when a change has occurred to a tag. The Server Item objects 202 store a new value internally and notify every item in their associated collection of UIExpression objects in the set of UIExpression objects 204 of the value change.

An ExpressionMgr 210, during initialization, ensures that each UIExpression object of the set of UIExpression objects 204 is created and bound correctly. While ServerItem objects 202 only hold pointers to the relative expressions, the ExpressionMgr 210 holds the entire collection of UIExpression objects for the system.

Each of the set of UIExpression objects 204 is responsible for recalculating its expression as tags change. UIExpression objects 204 are notified of changes by ServerItem objects. Each UIExpression object has a list of tag identifiers (one for each tag in the expression). When an update is requested the UIExpression object goes to a ServerItem list and gets the values of all the tags in the expression. The expression is then evaluated and a result is obtained. The UIExpression objects 204 have a collection of pointers to UIConnection objects 212. Each UIConnection object in a UIExpression object's list is notified of the new expression value. It is noted that the use of "n" to denote a set of pointers at several points in FIG. 3 does not indicate that all the object classes have the same number of pointers to the other classes.

A ConnectionMgr object 214, during initialization, ensures that each of the UIConnection objects 212 is created and bound correctly. While the UIExpression objects 204 hold a collection of UIConnection object pointers that are interested in changes to expression values, the ConnectionMgr object 214 holds the entire collection of UIConnection objects for the system.

The UIConnection objects 212 are directly bound to an animation behavior interface between the data exchange component 110 and animation components. When a value or expression changes, a corresponding one of the UIExpression objects 204 will go through it's list of UIConnection objects and call directly into a dispatch interface to a corresponding animation behavior (component) for an animated display object.

Having described an exemplary internal structure for the data exchange component 110, it is emphasized that the present invention is not intended to be limited to the disclosed structural arrangement. Those skilled in the art will readily appreciate that a variety of internal architectures, including alternative object class definitions, can be incorporated into a data exchange facility incorporated into a runtime graphics animation arrangement incorporating the present invention.

Figure 4:
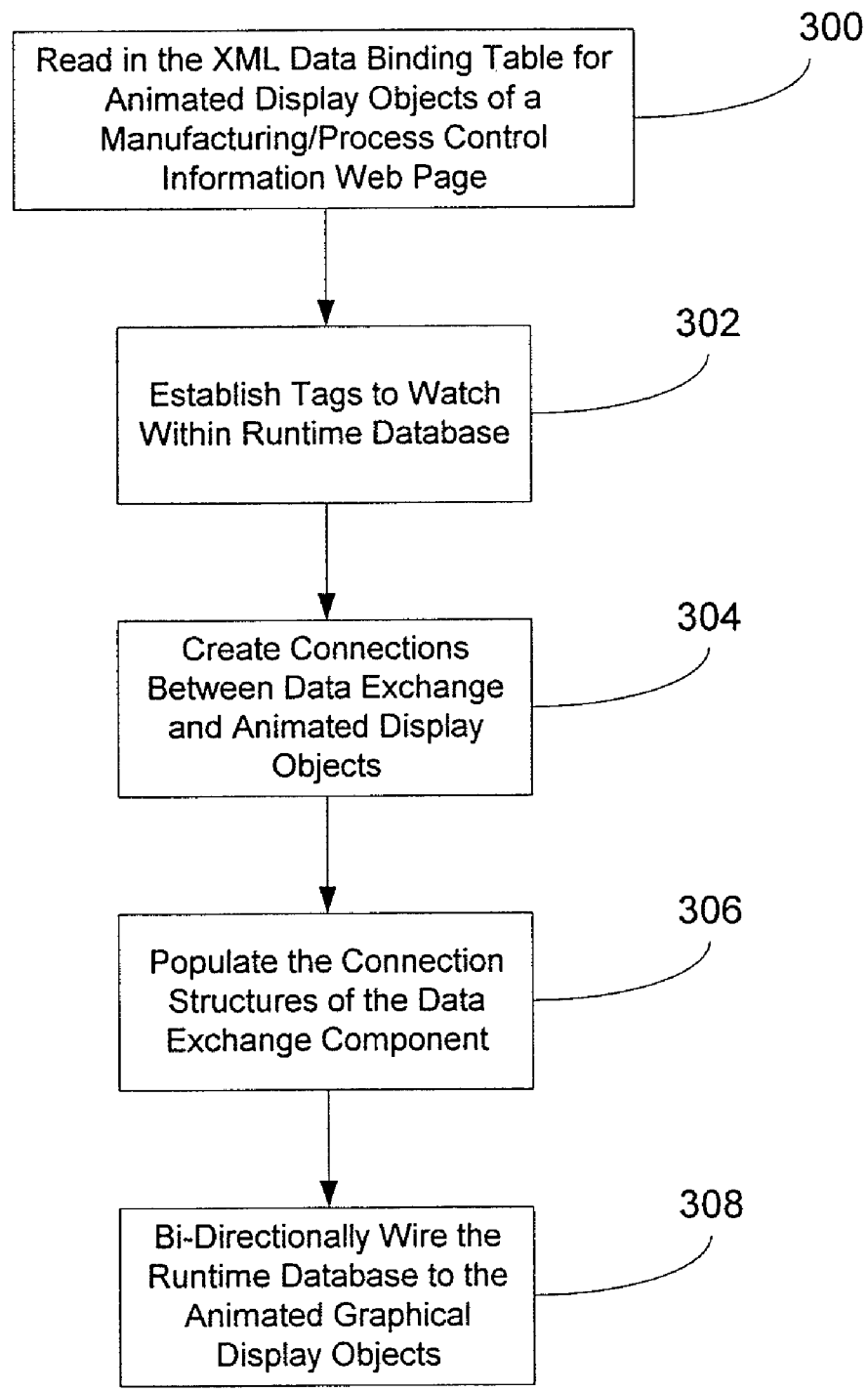
FIG. 4 is a flowchart summarizing a set of exemplary steps for setting up a runtime database graphics animation engine data exchange component to accept runtime data from a portal server and forward the data to an animation component to generate displayed graphical interface objects.

Turning to FIG. 4, a set of stages are summarized for setting up the data links to facilitate animation of displayed objects on a graphical user interface generated by a browser-client according to a stream of runtime data provided by a portal server to the browser-client. The order in which the stages are executed is merely exemplary. As those skilled in the art will readily appreciate, many of the stages can be reordered without affecting the ultimate state of the established connection information linking the data exchange to both the RDB component and the animation components in the above-described manufacturing/process control real time web-page animation system.

The actions described herein below are performed, for example, when a web page having animated graphic display objects embodying the present invention is loaded into a browser and the browser loads all COM based objects. At this point, the display objects are ready to be displayed in their initial form on the browser's graphical user interface. Thereafter, during stage 300 the loaded data exchange component 110 reads an XML data binding table containing the tag binding information for the user interface objects associated with the loaded page.

Turning briefly to FIG. 5, an exemplary XML data binding table definition for an animated display is depicted. In the present example, there are three BindingExpressions corresponding to three graphic animation behaviors defined for two different target elements ("rect1" and "rect2"). The information in each of the three BindingExpressions is used by the data exchange component 110 to establish connections between the data exchange component 110 structures depicted in FIG. 3 and the runtime database component and the user interface objects (via the animation behavior components). A BehaviorMethod describes a particular type of animation behavior method called to handle a change to a value to a tagged value (e.g., "TankLevel") associated with a particular binding expression. The TargetElement attribute refers to the name of the HTML element that contains the graphic display element to be animated. The BehaviorMethod attribute refers to the name of the method that is called on the graphic display element when a tag expression is encountered. The TagExpression attribute refers to the tag or tag expression (i.e., programmatic expression) that is evaluated at runtime when a tag changes. The IsExpression attribute informs the data exchange component 110 whether the TagExpression value is a simple tag value or a tag expression.

With reference again to FIG. 4, during stage 302, the data exchange component 110 notifies the runtime database component (RDB client object) of tags to watch on the portal server 100 for purposes of updating the graphical user interface display. This includes animated display objects, but also extends to any display element tag that affects the operation of the loaded web page. The RDB object provides an IRuntimeDB interface to the data exchange component. The IRuntimeDB interface includes an AddItem( ) method used to specify which tags to watch on the server. With regard to the example provided in FIG. 5, in the XML binding table example, each <BindingExpression> section includes a "TargetElement" representing the display interface object and a TagExpression. The TagExpression can be a Tagname or, alternatively, an expression that references one or more tags (or even other expressions).

During stage 302, the Data exchange component 110 calls the AddItem( ) method on the IRuntimeDB interface, passing several parameters including the Tagname. One of the parameters accepted by the AddItem method is an output parameter allowing the RDB object to provide a pointer to an IOItem interface back to the Data exchange component 110. The IOItem interface allows the data exchange component 110 to "push" values back to the RDB object. Each tag being listened on will have an associated IOItem interface. An ID for each interface is provided by its getID( ) method.

Also during stage 302, the data exchange component 110 calls a SetItemListener( ) method on IOItem interface provided by the RDB object. The SetItemListener( ) method takes a dispatch interface called IRDBItemListener provided by the data exchange component 110 and is used by the RDB object to notify the data exchange component 110 of value changes.

The data exchange component 110 implements the IRDBItemListener interface. The RDB object calls the UpdateItem( ) method of the IRDBItemListener interface to notify the data exchange component 110 of tag changes received via the real-time process data 104. An ID number (corresponding to the appropriate IOItem instance) and the new value will be passed in. (see the "New Value from RDB" walkthrough section below). At this point the RDB object is prepared to receive notification of updates made to one or more tag values.

Next, during stage 304 the data exchange component creates its connections to the animated user interface display objects via animation components. As mentioned previously herein above, the data exchange component 110 creates a private structure to maintain a list of ServerItem objects. This structure is referred to as an ItemManagerMap. Another private structure called ExpressionMap is created by the data exchange component 110 to maintain UIExpression objects. Finally, a ConnectionMap maintains UIConnection objects.

Each tag that is to be monitored has a ServerItem object in the ItemManagerMap. Each user interface object point of notification has a UIConnection object in the Expression Manager. The UIExpression objects are responsible for resolving an expression down to its value and passing it on to the appropriate UIConnection objects.

Next, during stage 306, the data exchange component 110 populates its internal structures created during step 304. In particular, for each tag to be listened on, there is a ServerItem object created in the ItemManagerMap. The RDB object provides a TagId value assigned to each ServerItem object. The XML data binding table provides information for one or more UIExpression and UIConnection objects added to their respective map structures. Each ServerItem object has at least one expression. An m_key within each UIconnection object contains a unique number generated by the data exchange component 110. A *p_UpdateUIObject value for each UIconnection object is provided by a corresponding graphical display object. A *p_IOItem value for each ServerItem object is provided by the RDB object.

Next, during stage 308, each animated graphical display behavior is wired to a corresponding runtime database tag. In particular, with regard to enabling a new RDB object value to affect an animation behavior of a display object, each UIConnection entry contains a reference to a UIObject as well as a behavior method. When the RDB object provides a new value to the data exchange component 110, that value will be passed as a parameter to a call of the corresponding graphical display object's animation behavior method. Each UIConnection entry will contain an IDispatch pointer to a graphical interface object as well as a behavior method DispID (dispatch ID). When a new value comes from the RDB object that value will be passed as a parameter in the method call via a call to the graphical interface object's IDispatch.Invoke method using the cached behavior method's dispatch ID.

With regard to enabling a connection from a graphical interface object to a corresponding tag in the RDB object, at the same time that the UIConnection entry is setup a call to a method on the UIObject (SetDataExchange) is made so that a graphical display object to data exchange component 110 connection can be made. When a graphical display object changes a value the graphical display object to data exchange connection is used to communicate the change back to the RDB object. In particular, at the same time that the UIConnection entry is set up a call to a graphical display object's SetDataExchange method is made so that a graphical display object to data exchange component 110 connection can be made. The SetDataExchange method is passed a unique key value and an IUpdateServer interface that points back to the data exchange component 110's single instance of an IUpdateServer COM object. When a graphic display object changes a value, the IUpdateServer interface is used to communicate the change (ultimately) back to the RDB object using the unique key value cached from the call to the SetDataExchange.

Figure 6:
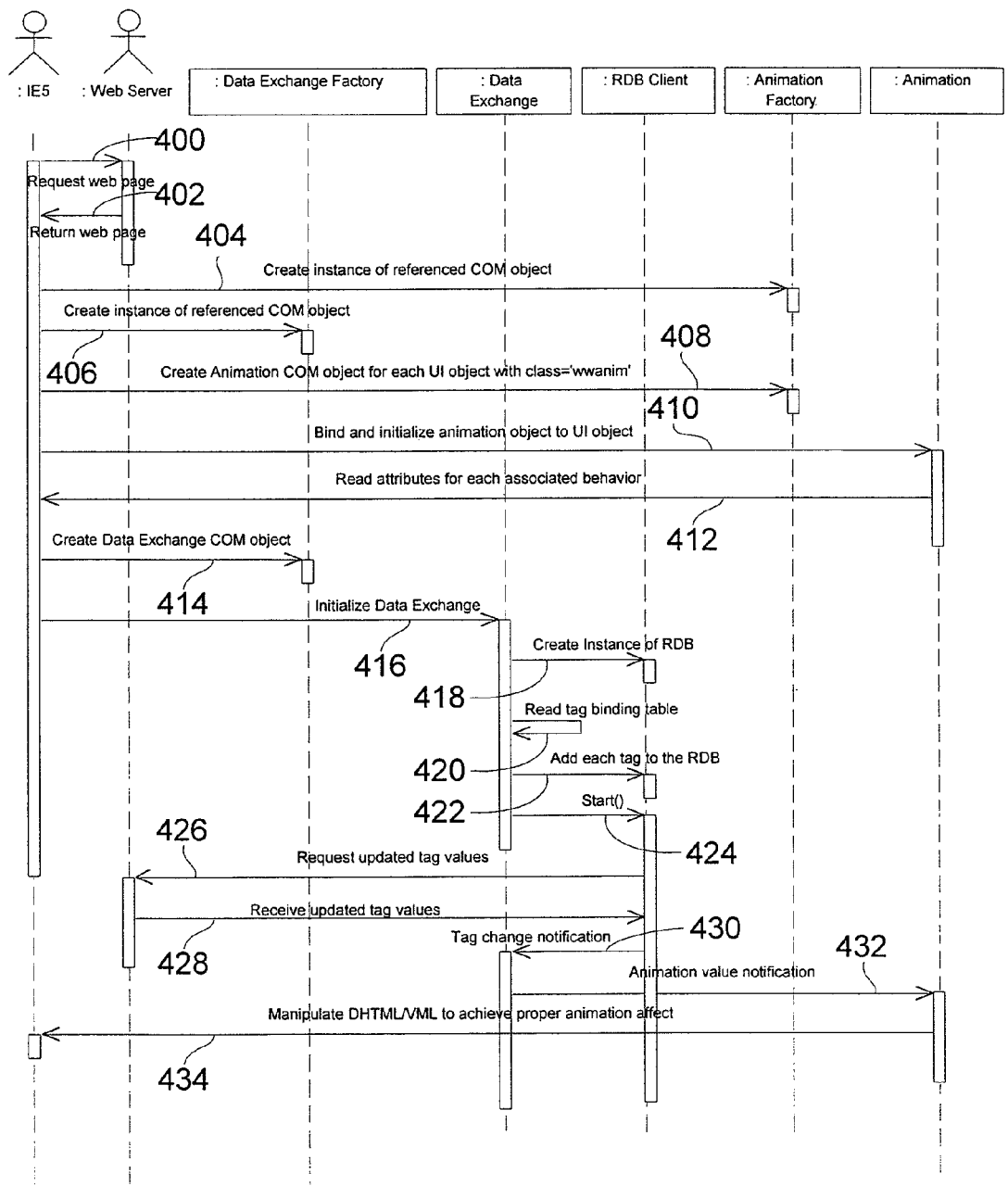
FIG. 6 is a sequence diagram summarizing a set of steps performed by a system embodying the present invention to initialize and then execute animation in response to changes to tag values from a runtime system.

Turning now to FIG. 6 a sequence diagram summarizes a set of steps for initializing and then executing a real-time graphics animation system embodying the present invention. The intention of this description is to provide a more generalized description of the systematic creation of objects supporting real-time animation of a manufacturing/process control view via a browser connection to a web server. This view helps to visualize the interdependence of various created objects that is less evident in the previous flowchart.

During step 400 a browser (e.g., Internet Explorer 5.0) client requests the portal server 100 to download a particular manufacturing/process control page containing animated graphical display objects whose animation behavior is determined by a set of tagged values maintained by a runtime database. During step 402 the portal server 100 passes the requested web page to the requesting browser client.

The browser, based upon the downloaded web page, creates an instance of an animation factory object during step 404. The animation factory object is a COM object that includes interfaces known by MICROSOFT's INTERNET EXPLORER. Animation factory objects create instances of identified animation COM objects for performing specified animation methods. Next, at step 406 the browser creates an instance of a data exchange factory that is executed to create the data exchange COM object component. Next, at step 408 the browser calls the animation factory object to create animation COM objects for each graphical interface object of a class that supplies an animation behavior. Next, during step 410, the newly created objects are bound and initialized on their corresponding graphical interface objects. Thereafter, at step 412 the animation objects read their corresponding animation behavior attributes to establish an initial animation display state.

Having initialized the graphic display object animation behavior components, at step 414 the browser calls upon the data exchange factory to build a data exchange component 110 and populate its structures based upon the animation component objects created and bound for the graphic display objects during the previous initialization steps. After creating the data exchange component 110, during step 416 the browser executes a call on the data exchange component 110 to commence initializing its connection structures. However, before such connections can be created, the data exchange component 110 during step 418 issued a call to create an RDB client object that communicates with the portal server 100 to obtain updated tag values affecting graphic display object animation behavior. During steps 420 and 422 the data exchange component 110 reads the tag binding table and adds corresponding tag entries to the RDB client object. After initializing the RDB client object, the data exchange component issues a start call to the RDB client object to initiate its tracking of changes to data corresponding to the tags established during step 422. Such changes are obtained, by way of example, during step 426 wherein the RDB client object queries a runtime database maintained by the portal server that contains real-time manufacturing/process control system operation information corresponding to the defined animation components.

If a tagged value has changed, then the portal server provides the new value to the RDB client object during step 428. In turn, during step 430 the RDB client object issues a tag change notification to the data exchange component. More particularly, the RDB client object calls the UpdateItem( ) method of the IRDBItemListener interface that was provided to it by the data exchange component during the above-described wiring process between these two components. An ID (representing the specific tag) and the new value are passed as parameters. The implementation of the UpdateItem( ) method is in the data exchange. This method will add the item to the DataExchange queue. If a value for the same ID is already in the queue then it will be replaced with the new value. Alternatively, the values are sent sequentially to avoid violation of standard queue protocols.

Thereafter, during step 432 a thread in the data exchange component 110 pops an updated ID off the queue containing the changed value. The data exchange component searches the ItemManagerMap looking for a ServerItem with a matching ID value. The m_value data member will be set with the new value from the de-queued item. Thereafter, each affected UIExpression in the m_ExpressionMap will be passed the new value. The affected UIExpression objects will evaluate the expression once and call the NewValue( ) method of each UIConnection object associated with the particular UIExpression object during step 432. The receiving graphical display object animation components will update their corresponding graphical display objects based upon the received values and an animation behavior definition.

The above example considers an expressions having a single tag. However, the XML data binding table may have an multi-part expression that consists of more then a simple Tagname. During the wiring process this expression is parsed and one ServerItem exists in the ItemManagerMap for each Tagname that is used in the expression. Furthermore, there is only one UIExpression object for the expression. The UIExpression object will have its m_isExpression data member set to true. The m_ExpressionMap for each ServerItem in the expression has a pointer to the same UIExpression point. By doing this the UIExpression object is notified if any part of the expression is changed. Before the NewValue( ) method is called the UIExpression passes the expression through an expression evaluation method to obtain the calculated value. This value will be passed as a NewValue parameter. No user updates will be allowed on expression based graphic display objects.

Alternatively to changes originating from the portal server, a human can change a value for a graphic display object via touch links (mouse click or keyboard). In response, the UI object calls the SetValue method of the IUpdateServer interface (provided to it by the data exchange component 110 during the wiring process). The UIConnection Key value (m_key) and the new value are passed in. The DataExchange searches the ExpressionMap for the UIConnection with the matching key. PokeValue is called on the IOItem interface reference in the UIConnection object. The RDB client object updates the portal server with the new value.

Turning to FIG. 7 an exemplary set of animation behaviors are depicted. The animation behaviors' corresponding XSL transformation output used by an animation component at runtime or during initialization are described herein below.

500 User Inputs—Discrete

```
<v:group
    class           = 'wwanim'
    id              = 'rect1'
    ww_object       = 'rect1_object'
    ww_touchlink    = 'rect1_touchlink'
    ww_behaviorlist = "ww_touchlink"
    <v:rect
        id          = 'rect1_object'
        <Behavior
            id              = 'rect1_touchlink'
            ww_type         = 'wwtouchlink'
            ww_actionType   = 'UserInputDiscrete'
            ww_VirtKey      = '65'
            ww_cKeyFlags    = '0'
            ww_msgToUser    = 'Here is my message'
            ww_onMessage    = 'good'
            ww_offMessage   = 'bad'
            ww_setPrompt    = 'Open'
            ww_resetPrompt  = 'Close'
            ww_inputOnly    = 'true'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "UserInputDiscrete"
    TagExpressionOrg = "Discrete_tag"
    TagExpression    = "var1"
    ReadWrite        = "true"
    IsExpression     = "false""
    <ExpressionTags>
        <Tag
            Item     = "discrete_tag"
            VarName  = "var1"
            ConnID   = "1">
        </Tag>
    </ExpressionTags>
</BindingExpression>
```

502 User Inputs—Analog

```
<v:group
    class           = 'wwanim'
    id              = 'rect1'
    ww_object       = 'rect1_object'
    ww_touchlink    = 'rect1_touchlink'
    ww_behaviorlist = "ww_touchlink"
    ww_format       = 'Value = ###.00.'// Only appears
                                  for Text and Button objects
    <v:rect
        id          = 'rect1_object'
        <Behavior
            id                = 'rect1_touchlink'
            ww_type           = 'wwtouchlink'
            ww_actionType     = 'UserInputAnalog'
            ww_VirtKey        = '65'
            ww_cKeyFlags      = '0'
            ww_msgToUser      = 'Here is my message'
            ww_inputOnly      = 'true'
            ww_minAnalogValue = '-100.0'
            ww_maxAnalogValue = '100.0'
            ww_keyPadEnabled  = 'false'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "UserInputAnalog"
    TagExpressionOrg = "Analog_tag"
    TagExpression    = "var1"
    ReadWrite        = "true"
    IsExpression     = "false">
    <ExpressionTags>
        <Tag
            Item     = "TankLevel.LoStatus"
            VarName  = "var1"
            ConnID   = "1">
        </Tag>
    </ExpressionTags>
</BindingExpression>
```

504 User Inputs—String

```
<v:group
    class           = 'wwanim'
    id              = 'rect1'
    ww_object       = 'rect1_object'
    ww_touchlink    = 'rect1_touchlink'
    ww_behaviorlist = "ww_touchlink"
    <v:rect
        id          = 'rect1_object'
        <Behavior
            id                 = 'rect1_touchlink'
            ww_type            = 'wwtouchlink'
            ww_actionType      = 'UserInputString'
            ww_VirtKey         = '65'
            ww_cKeyFlags       = '0'
            ww_msgToUser       = 'Here is my message'
            ww_inputOnly       = 'true'
            ww_keyPadEnabled   = 'false'
            ww_charEchoEnabled = 'true'>
        </Behavior>
    </v:rect>
</v:group> <!-- rect1 -->
```

Example Binding Expression in the Data Binding Table.

```
<BindingExpression
    TargetElement       = "rect1"
    BehaviorMethod      = "UserInputString"
    TagExpressionOrg    = "String_tag"
    TagExpression       = "var1"
    ReadWrite           = "true"
    IsExpression        = "false">
    <ExpressionTags>
        <Tag
            Item        = "string_tag"
            VarName     = "var1"
            ConnID      = "1">
        </Tag>
    </ExpressionTags>
</BindingExpression>
```

506 Slider—Vertical

```
<v:group
    class               = 'wwanim'
    id                  = 'rect1'
    ww_object           = 'rect1_object'
    ww_SliderVertical   = 'rect1_SliderVertical'
    ww_behaviorlist     = "ww_SliderVertical"
    title               = 'rect1'
    style               = "position:absolute;...;margin-left:170px">
    <v:rect
        id              = 'rect1_object'
        <Behavior
            id              = 'rect1_SliderVertical'
            ww_type         = 'ww_SliderVertical'
            ww_actionType   = 'SliderVertical'
            ww_anchor       = 'top'
            ww_atTop        = '200.000000'
            ww_atBottom     = '100.000000'
            ww_up           = '0.000000'
            ww_down         = '125.000000'>
        </Behavior>
    </v:rect>
</v:group> <!-- rect1 -->
```

Example Binding Expression in the Data Binding Table.

```
<BindingExpression
    TargetElement       = "rect1"
    BehaviorMethod      = "SliderVertical"
    TagExpressionOrg    = "Analog_tag"
    TagExpression       = "var1"
    ReadWrite           = "true"
    IsExpression        = "false">
    <ExpressionTags>
        <Tag
            Item        = "Tank1_Level"
            VarName     = "var1"
            ConnID      = "1">
        </Tag>
    </ExpressionTags>
</BindingExpression>
```

508 Slider—Horizontal

```
<v:group
    class               = 'wwanim'
    id                  = 'rect1'
    ww_object           = 'rect1_object'
    ww_SliderHorizontal = 'rect1_SliderHorizontal'
    ww_behaviorlist     = "ww_SliderHorizontal"
    style               = "position:absolute;...;margin-top:50px">
    <v:rect
        id              = 'rect1_object'
        <Behavior
            id              = 'rect1_SliderHorizontal'
            ww_type         = 'wwtouchlink'
            ww_actionType   = 'SliderHorizontal'
            ww_anchor       = 'left'
            ww_atLeftEnd    = '0.000000'
            ww_atRightEnd   = '100.000000'
            ww_toLeft       = '0.000000'
            ww_toRight      = '200.000000'>
        </Behavior>
    </v:rect>
</v:group> <!-- rect1 -->
```

Example Binding Expression in the Data Binding Table.

```
<BindingExpression
    TargetElement       = "rect1"
    BehaviorMethod      = "SliderHorizontal"
    TagExpressionOrg    = "Analog_tag"
    TagExpression       = "var1"
    ReadWrite           = "true"
    IsExpression        = "false">
    <ExpressionTags>
        <Tag
            Item        = "Tank1_Temperature"
            VarName     = "var1"
            ConnID      = "1">
        </Tag>
    </ExpressionTags>
</BindingExpression>
```

510 Touch Pushbuttons—Discrete

```
<v:group
    class               = 'wwanim'
    id                  = 'rect1'
    ww_object           = 'rect1_object'
    ww_touchlink        = 'rect1_touchlink'
    ww_behaviorlist     = "ww_touchlink"
    <v:rect
        id              = 'rect1_object'
        <Behavior
            id              = 'rect1_touchlink'
            ww_type         = 'wwtouchlink'
            ww_actionType   = 'PushbuttonDiscrete'
            ww_VirtKey      = '65'
            ww_cKeyFlags    = '0'
            ww_DiscreteAction = 'toggle'>
        </Behavior>
    </v:rect>
</v:group> <!-- rect1 -->
```

Example Binding Expression in the Data Binding Table.

```
<BindingExpression
    TargetElement       = "rect1"
    BehaviorMethod      = "PushbuttonDiscrete"
    TagExpressionOrg    = "Discrete_tag"
    TagExpression       = "var1"
    ReadWrite           = "true"
    IsExpression        = "false"
    <ExpressionTags>
        <Tag
            Item        = "discrete_tag"
            VarName     = "var1"
            ConnID      = "1">
```

512 Touch Pushbuttons—Action (Script)

```
<v:group
    class           = 'wwanim'
    id              = 'rect1'
    ww_object       = 'rect1_object'
    ww_touchlink    = 'rect1_touchlink'
    ww_behaviorlist = "ww_touchlink"
    <v:rect
        id          = 'rect1_object'
        <Behavior
            id                = 'rect1_touchlink'
            ww_type           = 'wwtouchlink'
            ww_actionType     = 'PushbuttonAction'
            ww_isOnKeyDown    = 'true'
            ww_stmtOnKeyDown  = 'rect1_OnKeyDownScript( );'
            ww_isWhileDown    = 'true'
            ww_stmtWhileDown  = 'rect1_OnWhileDownScript( );'
            ww_whileFreq      = 0
            ww_isOnKeyUp      = 'false'
            ww_stmtOnKeyUp    = 'rect1_OnKeyUpScript( );'
            ww_VirtKey        = '65'
            ww_cKeyFlags      = '0'>
        </Behavior>
    </v:rect>
</v:group> <!-- rect1 -->
```

Note: The rect1_OnKeyDownScript( ) and rect1_OnKeyUpScript( ) functions are added to the HTML by the XSL transformation. These functions contain the actual converted InTouch script. The rect1_OnWhileDownScript( ) is created but not supported by the Animation component. There will not be an entry in the Data Binding Table for this behavior.

514 Touch Pushbuttons—Show Window

```
<v:group
    class           = 'wwanim'
    id              = 'rect1'
    ww_object       = 'rect1_object'
    ww_touchlink    = 'rect1_touchlink'
    ww_behaviorlist = "ww_touchlink"
    <v:rect
        id          = 'rect1_object'
        <Behavior
            id              = 'rect1_touchlink'
            ww_type         = 'wwtouchlink'
            ww_actionType   = 'PushbuttonShowWindow'
            ww_windowName   = 'Plant Floor 1'>
        </Behavior>
    </v:rect>
</v:group> <!-- rect1 -->
```

The affect of invoking this Show Window Touch Link is that a script will be created and executed that will contain a call to a global Show( ) function.

There will not be an entry in the Data Binding Table for this behavior.

516 Touch Pushbuttons—Hide Window

```
<v:group
    class           = 'wwanim'
```

```
    id              = 'rect1'
    ww_object       = 'rect1_object'
    ww_touchlink    = 'rect1_touchlink'
    ww_behaviorlist = "ww_touchlink"
    <v:rect
        id          = 'rect1_object'
        <Behavior
            id              = 'rect1_touchlink'
            ww_type         = 'wwtouchlink'
            ww_actionType   = 'PushbuttonCloseWindow'
            ww_windowName   = 'www.webserver.com/
                              windowset1/window001.htm'>
        </Behavior>
    </v:rect>
</v:group> <!-- rect1 -->
```

The affect of invoking this Hide Window Touch Link is that a script will be created and executed that will contain a call to a global Hide( ) function. The Hide( ) function closes the active popup window (dialog) or goes to the previous web page if its done in the active web page. In other words it ignores the window name. There will not be an entry in the Data Binding Table for this behavior.

518, 526, 534 Line, Text and Fill Color—Discrete

```
*** Replace the XXX with Line, Text or Fill.
<v:group
    class           = 'wwanim'
    id              = 'rect1'
    ww_type         = 'WWRectangle'
    ww_fill         = 'rect1_fill'
    ww_stroke       = 'rect1_stroke'
    ww_object       = 'rect1_object'
    ww_XXXcolor     = 'rect1_XXXcolor' ***
    ww_behaviorlist = "ww_XXXcolor"
    <v:rect
        id              = 'rect1_object'
        stroke          = 'true'
        strokeweight    = '1px'
        strokecolor     = 'rgb(0,0,0)'
        fill            = 'true'
        fillcolor       = 'rgb(255,255,131)'>
        <v:stroke
            id          = 'rect1_stroke'
            dashstyle   = 'solid'/>
        <Behavior
            id              = 'rect1_XXXcolor' ***
            ww_type         = 'wwXXXcolor' ***
            ww_actiontype   = 'XXXColorDiscrete' ***
            ww_colorOn      = 'rgb(255,0,0)'
            ww_colorOff     = 'rgb(0,255,0)'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "XXXColorDiscrete" ***
    TagExpressionOrg = "Discrete_tag"
    TagExpression    = "var1"
    ReadWrite        = "false"
    IsExpression     = "false">
    <ExpressionTags>
        <Tag
            Item     = "discrete_tag"
            VarName  = "var1"
            ConnID   = "1">
```

-continued

```
        </Tag>
    </ExpressionTags>
</BindingExpression>
```

520, 528, and 536 Line, Text and Fill Color—Analog

\*\*\* Replace the XXX with Line, Text or Fill.
```
<v:group
    class               = 'wwanim'
    id                  = 'rect1'
    ww_fill             = 'rect1_fill'
    ww_stroke           = 'rect1_stroke'
    ww_object           = 'rect1_object'
    ww_XXXcolor         = 'rect1_XXXcolor' ***
    ww_behaviorlist     = "ww_XXXcolor"
    <v:rect
        id              = 'rect1_object'
        stroke          = 'true'
        strokeweight    = '1px'
        strokecolor     = 'rgb(0,0,0)'
        fill            = 'true'
        fillcolor       = 'rgb(255,255,131)'>
        <v:stroke
            id          = 'rect1_stroke'
            dashstyle   = 'solid'/>
            <Behavior
                id              = 'rect1_XXXcolor' ***
                ww_type         = 'wwXXXcolor' ***
                ww_actiontype   = 'XXXColorAnalog' ***
                ww_breakpoint1  = 20
                ww_breakpoint2  = 40
                ww_breakpoint3  = 50
                ww_breakpoint4  = 70
                ww_color1       = 'rgb(255,0,0)'
                ww_color2       = 'rgb(0,255,0)'
                ww_color3       = 'rgb(255,0,0)'
                ww_color4       = 'rgb(255,0,0)'
                ww_color5       = 'rgb(255,0,0)'>
            </Behavior>
    </v:rect>
</v:group> <!-- rect1 -->
```

Example Binding Expression in the Data Binding Table.

```
<BindingExpression
    TargetElement       = "rect1"
    BehaviorMethod      = "XXXColorAnalog" ***
    TagExpressionOrg    = "Analog_tag"
    TagExpression       = "var1"
    ReadWrite           = "false"
    IsExpression        = "false">
    <ExpressionTags>
        <Tag
            Item        = "TankLevel"
            VarName     = "var1"
            ConnID      = "1">
        </Tag>
    </ExpressionTags>
</BindingExpression>
```

522, 530 and 538 Line, Text and Fill Color—Discrete Alarm

\*\*\* Replace the XXX with Line, Text or Fill.
```
<v:group
    class               = 'wwanim'
    id                  = 'rect1'
    ww_type             = 'WWRectangle'
    ww_fill             = 'rect1_fill'
    ww_stroke           = 'rect1_stroke'
    ww_object           = 'rect1_object'
    ww_XXXcolor         = 'rect1_XXXcolor' ***
    ww_behaviorlist     = "ww_XXXcolor"
    <v:rect
        id              = 'rect1_object'
        stroke          = 'true'
        strokeweight    = '1px'
        strokecolor     = 'rgb(0,0,0)'
        fill            = 'true'
        fillcolor       = 'rgb(255,255,131)'>
        <v:stroke
            id          = 'rect1_stroke'
            dashstyle   = 'solid'/>
            <Behavior
                id              = 'rect1_XXXcolor' ***
                ww_type         = 'wwXXXcolor' ***
                ww_actiontype   = 'XXXColorDiscreteAlarm' ***
                ww_colorNormal  = 'rgb(255,0,0)'
                ww_colorAlarm   = 'rgb(0,255,0)' >
            </Behavior>
    </v:rect>
</v:group> <!-- rect1 -->
```

Example Binding Expression in the Data Binding Table.

```
<BindingExpression
    TargetElement       = "rect1"
    BehaviorMethod      = "XXXorDiscreteAlarm" ***
    TagExpressionOrg    = "tagname"
    TagExpression       = "var1"
    ReadWrite           = "true"
    IsExpression        = "false">
    <ExpressionTags>
        <Tag
            Item        = "tagname.alarm"
            VarName     = "var1"
            ConnID      = "1">
        </Tag>
    </ExpressionTags>
</BindingExpression>
```

Tagname is any Discrete, Integer or Real tagname type, Indirect Analog or Group Variable. The XSL transformation will implicitly add the .alarm dot field to the end of tagname in the Item attribute of the <tag> element.

524, 532, and 540 Line, Text and Fill Color—Analog Alarm

\*\*\* Replace the XXX with Line, Text or Fill.
```
<v:group
    class       = 'wwanim'
    id          = 'rect1'
    ww_type     = 'WWRectangle'
    ww_fill     = 'rect1_fill'
    ww_stroke   = 'rect1_stroke'
```

-continued
```
ww_object       = 'rect1_object'
ww_XXXcolor     = 'rect1_XXXcolor' ***
ww_behaviorlist = "ww_XXXcolor"
<v:rect
    id           = 'rect1_object'
    stroke       = 'true'
    strokeweight = '1px'
    strokecolor  = 'rgb(0,0,0)'
    fill         = 'true'
    fillcolor    = 'rgb(255,255,131)'>
    <v:stroke
        id        = 'rect1_stroke'
        dashstyle = 'solid'/>
    <Behavior
        id           = 'rect1_XXXcolor' ***
        ww_type      = 'wwXXXcolor' ***
        ww_actiontype = 'XXXColorAnalogAlarm' ***
        ww_alarmType = "value"       // Types: value, deviation or ROC
        ww_color1    = 'rgb(255,0,0)'  // First or Normal color
        ww_color2    = 'rgb(0,255,0)'  // Second, ROC or Minor Dev. color
        ww_color3    = 'rgb(255,0,0)'  // Third or Major Dev. color
        ww_color4    = 'rgb(255,0,0)'  // Forth color
        ww_color5    = 'rgb(255,0,0)'  // Fifth color
        >
    </Behavior>
</v:rect>
</v:group> <!-- rect1 -->
```

The Data Binding entries that the XSL transformation produces in its output change depending on what the ww_alarmType is set too.

Tagname (in the sections below) is any Discrete, Integer or Real tagname type, Indirect Analog or Group Variable. The XSL transformation will implicitly add the appropriate dot field to the end of the tagname in the Item attribute of the <tag> element for each data binding entry.

Data Binding Entry for ww_alarmType="ROC" (Rate of Change)

```
<BindingExpression
    TargetElement   = "rect1"
    BehaviorMethod  = "XXXColorAnalogAlarm_ROCStatus" ***
    TagExpressionOrg = "tagname.ROCStatus"
    TagExpression   = "var1"
    ReadWrite       = "false"
    IsExpression    = "false">
    <ExpressionTags>
        <Tag
            Item    = "tagname.ROCStatus"
            VarName = "var1"
            ConnID  = "1">
        </Tag>
    </ExpressionTags>
</BindingExpression>
```

Data Binding Entries for ww_alarmType="value"

```
<BindingExpression
    TargetElement   = "rect1"
    BehaviorMethod  = "XXXColor-
                       AnalogAlarm_LoLoStatus" ***
    TagExpressionOrg = "tagname.LoLoStatus"
    TagExpression   = "var1"
    ReadWrite       = "false"
    IsExpression    = "false">
    <ExpressionTags>
        <Tag
            Item    = "tagname.LoLoStatus"
            VarName = "var1"
```

-continued
```
            ConnID  = "1">
        </Tag>
    </ExpressionTags>
</BindingExpression>
<BindingExpression
    TargetElement   = "rect1"
    BehaviorMethod  = "XXXColor-
                       AnalogAlarm_LoStatus" ***
    TagExpressionOrg = "tagname.LoStatus"
    TagExpression   = "var1"
    ReadWrite       = "false"
    IsExpression    = "false">
    <ExpressionTags>
        <Tag
            Item    = "tagname.LoStatus"
            VarName = "var1"
            ConnID  = "1">
        </Tag>
    </ExpressionTags>
</BindingExpression>
<BindingExpression
    TargetElement   = "rect1"
    BehaviorMethod  = "XXXColor-
                       AnalogAlarm_HiStatus" ***
    TagExpressionOrg = "tagname.HiStatus"
    TagExpression   = "var1"
    ReadWrite       = "false"
    IsExpression    = "false">
    <ExpressionTags>
        <Tag
            Item    = "tagname.HiStatus"
            VarName = "var1"
            ConnID  = "1">
        </Tag>
    </ExpressionTags>
</BindingExpression>
<BindingExpression
    TargetElement   = "rect1"
    BehaviorMethod  = "XXXColor-
                       AnalogAlarm_HiHiStatus" ***
    TagExpressionOrg = "tagname.HiHiStatus"
    TagExpression   = "var1"
    ReadWrite       = "false"
    IsExpression    = "false">
    <ExpressionTags>
        <Tag
            Item    = "tagname.HiHiStatus"
```

```
                VarName        = "var1"
                ConnID         = "1">
            </Tag>
        </ExpressionTags>
</BindingExpression>
```

Data Binding Entries for ww_alarmType="deviation"

```
<BindingExpression
    TargetElement      = "rect1"
    BehaviorMethod     = "XXXColorAnalogAlarm__MinorDevStatus" ***
    TagExpressionOrg   = "tagname.MinorDevStatus"
    TagExpression      = "var1"
    ReadWrite          = "false"
    IsExpression       = "false">
    <ExpressionTags>
        <Tag
            Item           = "tagname.MinorDevStatus"
            VarName        = "var1"
            ConnID         = "1">
        </Tag>
    </ExpressionTags>
</BindingExpression>
<BindingExpression
    TargetElement      = "rect1"
    BehaviorMethod     = "XXXColorAnalogAlarm__MajorDevStatus" ***
    TagExpressionOrg   = "tagname.MajorDevStatus"
    TagExpression      = "var1"
    ReadWrite          = "false"
    IsExpression       = "false">
    <ExpressionTags>
        <Tag
            Item           = "tagname.MajorDevStatus"
            VarName        = "var1"
            ConnID         = "1">
        </Tag>
    </ExpressionTags>
</BindingExpression>
```

542 Object Size—Height

```
<v:group
    class              = 'wwanim'
    id                 = 'rect1'
    ww__object         = 'rect1__object'
    ww__ObjectSizeHeight = 'rect1__ObjectSizeHeight'
    ww__behaviorlist   = "ww__ObjectSizeHeight"
    style              = "position:absolute;...;height:100px;
                          margin-top:0;">
    <v:rect
        id                 = 'rect1__object'
        <Behavior
            id                 = 'rect1__ObjectSizeHeight'
            ww__type           = 'wwlinecolor'
            ww__actiontype     = 'ObjectSizeHeight'
            ww__MaxValue       = 0.0
            ww__MinValue       = 200.0
            ww__MaxPercent     = 70
            ww__MinPercent     = 20
            ww__Anchor         = 'top'>   // top, middle
                                             or bottom
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "ObjectSizeHeight"
    TagExpressionOrg   = "Analog_tag"
    TagExpression      = "var1"
    ReadWrite          = "false"
    IsExpression       = "false">
    <ExpressionTags>
        <Tag
            Item           = "Analog_tag"
            VarName        = "var1"
            ConnID         = "1">
        </Tag>
    </ExpressionTags>
</BindingExpression>
```

544 Object Size—Width

```
<v:group
    class              = 'wwanim'
    id                 = 'rect1'
    ww__object         = 'rect1__object'
    ww__ObjectSizeWidth = 'rect1__ObjectSizeWidth'
    ww__behaviorlist   = "ww__ObjectSizeWidth"
    title              = 'rect1'
    style              = "position:absolute;...;width:220px;
                          margin-left:0;">
    <v:rect
        id                 = 'rect1__object'
        <Behavior
            id                 = 'rect1__ObjectSizeWidth'
            ww__type           = 'wwlinecolor'
            ww__actiontype     = 'ObjectSizeWidth'
            ww__MaxValue       = 0.0
            ww__MinValue       = 200.0
            ww__MaxPercent     = 70
            ww__MinPercent     = 20
            ww__Anchor         = 'left'>   // left, center
```

-continued

```
            or right
    </Behavior>
  </v:rect>
</v:group> <!-- rect1 -->
```

Example Binding Expression in the Data Binding Table.

```
<BindingExpression
    TargetElement      = "rect1"
    BehaviorMethod     = "ObjectSizeWisth"
    TagExpressionOrg   = "Analog_tag"
    TagExpression      = "var1"
    ReadWrite          = "false"
    IsExpression       = "false">
    <ExpressionTags>
        <Tag
            Item       = "Analog_tag"
            VarName    = "var1"
            ConnID     = "1">
        </Tag>
    </ExpressionTags>
</BindingExpression>
```

546 Location—Vertical

```
<v:group
    class              = 'wwanim'
    id                 = 'rect1'
    ww_object          = 'rect1_object'
    ww_locationvertical = 'rect1_locationvertical'
    ww_behaviorlist    = "ww_locationvertical"
    style              = "position:absolute;...;margin-top:50px">
    <v:rect
        id             = 'rect1_object'
        <Behavior
            id         = 'rect1_locationvertical'
            ww_type    = 'wwLocation'
            ww_actionType = 'LocationVertical'
            ww_atTop   = '200.000000'
            ww_atBottom = '100.000000'
            ww_up      = '0.000000'
            ww_down    = '125.000000'>
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "LocationVertical"
    TagExpressionOrg   = "Analog_tag"
    TagExpression      = "var1"
    ReadWrite          = "false"
    IsExpression       = "false">
    <ExpressionTags>
        <Tag
            Item       = "Analog_tag"
            VarName    = "var1"
            ConnID     = "1">
        </Tag>
    </ExpressionTags>
</BindingExpression>
```

548 Location—Horizontal

```
<v:group
    class              = 'wwanim'
    id                 = 'rect1'
    ww_object          = 'rect1_object'
    ww_LocationHorizontal = 'rect1_locationhorizontal'
    ww_behaviorlist    = "ww_LocationHorizontal"
    style              = "position:absolute;...;margin-left:170px;">
    <v:rect
        id             = 'rect1_object'
        <Behavior
            id         = 'rect1_locationhorizontal'
            ww_type    = 'wwLocation'
            ww_actionType = 'Locationhorizontal'
            ww_atLeftEnd = '200.000000'
            ww_atRightEnd = '100.000000'
            ww_ToLeft  = '0.000000'
            ww_ToRight = '125.000000'>
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "Locationhorizontal"
    TagExpressionOrg   = "Analog_tag"
    TagExpression      = "var1"
    ReadWrite          = "false"
    IsExpression       = "false">
    <ExpressionTags>
        <Tag
            Item       = "Analog_tag"
            VarName    = "var1"
            ConnID     = "1">
        </Tag>
    </ExpressionTags>
</BindingExpression>
```

550 Visibility

```
<v:group
    class              = 'wwanim'
    id                 = 'rect1'
    ww_object          = 'rect1_object'
    ww_visibility      = 'rect1_visibility'
    ww_behaviorlist    = "ww_visibility"
    style              = "position:absolute;visibility=true;">
    <v:rect
        id             = 'rect1_object'
        <Behavior
            id         = 'rect1_visibility'
            ww_type    = 'wwvisibility'
            ww_actionType = 'visibility'
            ww_visibleState = 1>
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "visibility"
    TagExpressionOrg   = "Discrete_tag"
    TagExpression      = "var1"
```

```
                    ReadWrite         = "false"
                    IsExpression      = "false">
                <ExpressionTags>
                    <Tag
                        Item          = "discrete_tag"
                        VarName       = "var1"
                        ConnID        = "1">
                    </Tag>
                </ExpressionTags>
            </BindingExpression>
```

552 Blink

```
<v:group
    class           = 'wwanim'
    id              = 'rect1'
    ww_object       = 'rect1_object'
    ww_blink        = 'rect1_blink'
    ww_behaviorlist = "ww_blink"
    title           = 'rect1'
    style           = "position:absolute;visibility=true;">
    <v:rect
        id          = 'rect1_object'
        <Behavior
            id                  = 'rect1_blink'
            ww_type             = 'wwblink'
            ww_actionType       = 'Blink'
            ww_blinkSpeed       = '1'              // 0 = Slow, 1 = medium or 2 = fast
            ww_blinkInvisible   = 'false'
            ww_blinkTextColor   = 'rgb(255,0,0)'
            ww_blinkLineColor   = 'rgb(255,0,0)'
            ww_blinkFillColor   = 'rgb(255,0,0)'>
        </Behavior>
    </v:rect>
</v:group> <!-- rect1 -->
```

Example Binding Expression in the Data Binding Table.

```
<BindingExpression
    TargetElement       = "rect1"
    BehaviorMethod      = "Blink"
    TagExpressionOrg    = "Discrete_tag"
    TagExpression       = "var1"
    ReadWrite           = "false"
    IsExpression        = "false">
    <ExpressionTags>
        <Tag
            Item        = "discrete_tag"
            VarName     = "var1"
            ConnID      = "1">
        </Tag>
    </ExpressionTags>
</BindingExpression>
```

554 Orientation

```
<v:group
    class           = 'wwanim'
    id              = 'rect1'
    ww_type         = 'WWRectangle'
    ww_object       = 'rect1_object'
    ww_orientation  = 'rect1_orientation'
    ww_behaviorlist = "ww_orientation"
    style           = "position:absolute;rotation:20;">
    <v:rect
        id          = 'rect1_object'
        <Behavior
            id                  = 'rect1_orientation'
            ww_type             = 'wworientation'
            ww_actionType       = 'orientation'
            ww_MaxCCW           = 0           // Max Counter Clockwise value
            ww_MaxCW            = 100         // Max Clockwise value
            ww_CCWRotation      = 0           // Max Counter Clockwise angle
            ww_CWRotation       = 360         // Max Clockwise angle
            ww_XrotationPoint   = 0
            ww_YrotationPoint   = 0>
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "orientation"
    TagExpressionOrg   = "Analog_tag"
    TagExpression      = "var1"
    ReadWrite          = "false"
    IsExpression       = "false">
    <ExpressionTags>
        <Tag
            Item       = "Analog_tag"
            VarName    = "var1"
            ConnID     = "1">
        </Tag>
    </ExpressionTags>
</BindingExpression>
```

556 Disabled

```
<v:group
    class              = 'wwanim'
```

-continued

```
    id                 = 'rect1'
    ww_object          = 'rect1_object'
    ww_disabled        = 'rect1_disabled'
    ww_behaviorlist    = "ww_disabled"
    <v:rect
        id             = 'rect1_object'
        <Behavior
            id         = 'rect1_disibled'
            ww_type    = 'wwdisibled'
            ww_actionType = 'Disabled'
            ww_disabledState = 1>
        </Behavior>
```

```
    </v:rect>
</v:group> <!-- rect1 -->
```

Example Binding Expression in the Data Binding Table.

```
<BindingExpression
    TargetElement      = "rect1"
    BehaviorMethod     = "Disable"
    TagExpressionOrg   = "Discrete_tag"
    TagExpression      = "var1"
    ReadWrite          = "false"
    IsExpression       = "false">
    <ExpressionTags>
        <Tag
            Item       = "discrete_tag"
            VarName    = "var1"
            ConnID     = "1">
        </Tag>
    </ExpressionTags>
</BindingExpression>
```

558 Percent Fill—Vertical
Note: When both vertical and horizontal fills are enabled the background color comes from the vertical percent fill definition.

```
<v:group
    class                  = 'wwanim'
    id                     = 'rect1'
    ww_fill                = 'rect1_fill'
    ww_object              = 'rect1_object'
    ww_percentfillvertical = 'rect1_percentfillvertical'
    ww_behaviorlist        = "ww_percentfillvertical"
    ww_fill                = 'rect1_fill'
    title                  = 'rect1'
    <v:rect
        id                 = 'rect1_object'
        fill               = 'true'
        fillcolor          = 'rgb(111,111,111)'>    <!- background color -->
        <v:fill
            id             = 'rect1_fill'
            type           = 'frame'
            src            = 'Images/ffff83.png'    <!- foreground/fill color -->
            position       = '0.0, 0.0'/>
        <Behavior
            id             = 'rect1_percentfillvertical'
            ww_type        = 'wwpercentfillvertical'
            ww_actionType  = 'PrcentFillVertical'
            ww_valueAtMinFill = 0
            ww_valueAtMaxFill = 100
            ww_minPercentFill = 10
            ww_maxPercentFill = 90
            ww_direction   = 'up'                   // up or down
            ww_backgroundColor = 'rgb(111,111,111)'>
        </Behavior>
    </v:rect>
</v:group> <!-- rect1 -->
```

Example Binding Expression in the Data Binding Table.

```
<BindingExpression
    TargetElement      = "rect1"
    BehaviorMethod     = "PercentFillVertical"
    TagExpressionOrg   = "Analog_tag"
    TagExpression      = "var1"
    ReadWrite          = "false"
    IsExpression       = "false">
    <ExpressionTags>
        <Tag
            Item       = "Analog_tag"
            VarName    = "var1"
```

560 Percent Fill—Horizontal

Note: When both vertical and horizontal fills are enabled the background color comes from the vertical percent fill definition.

```
<v:group
    class                    = 'wwanim'
    id                       = 'rect1'
    ww_object                = 'rect1_object'
    ww_percentfillhorizontal = 'rect1_percentfillhorizontal'
    ww_behaviorlist          = "ww_percentfillhorizontal"
    ww_fill                  = 'rect1_fill'>
    <v:rect
        id        = 'rect1_object'
        fill      = 'true'
        fillcolor = 'rgb(111,111,111)'>          <!- background color -->
        <v:fill
            id       = 'rect1_fill'
            type     = 'frame'
            src      = 'Images/ffff83.png'       <!- foreground/fill color -->
            position = '0.0, 0.0'/>
        <Behavior
            id                   = 'rect1_percentfillhorizontal'
            ww_type              = 'wwpercentfillhorizontal'
            ww_actionType        = 'PrcentFillHorizontal'
            ww_valueAtMinFill    = 0
            ww_valueAtMaxFill    = 100
            ww_minPercentFill    = 10
            ww_maxPercentFill    = 90
            ww_direction         = 'left'        // left or right
            ww_backgroundColor   = 'rgb(111,111,111)'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "PercentFillHorizontal"
    TagExpressionOrg = "Analog_tag"
    TagExpression    = "var1"
    ReadWrite        = "false"
    IsExpression     = "false">
    <ExpressionTags>
        <Tag
            Item    = "Analog_tag"
            VarName = "var1"
            ConnID  = "1">
        </Tag>
    </ExpressionTags>
</BindingExpression>
```

562 Value Display—Discrete

```
<v:group
    class           = 'wwanim'
    id              = 'rect1'
    ww_type         = 'WWRectangle'
    ww_object       = 'rect1_object'
    ww_valuedisplay = 'rect1_valuedisplay'
    ww_behaviorlist = "ww_valuedisplay">
    <v:rect
        id           = 'rect1_object'
        <Behavior
            id            = 'rect1_valuedisplay'
            ww_type       = 'wwvaluedisplay'
            ww_actionType = 'ValueDisplayDiscrete'
            ww_onMessage  = 'good'
            ww_offMessage = 'bad'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "ValueDisplayDiscrete"
    TagExpressionOrg = "Discrete_tag"
    TagExpression    = "var1"
    ReadWrite        = "false"
    IsExpression     = "false">
    <ExpressionTags>
        <Tag
            Item    = "Discrete_tag"
            VarName = "var1"
            ConnID  = "1">
        </Tag>
    </ExpressionTags>
</BindingExpression>
```

564 Value Display—Analog

```
<v:group
    class           = 'wwanim'
    id              = 'rect1'
    ww_type         = 'WWRectangle'
    ww_object       = 'rect1_object'
    ww_valuedisplay = 'rect1_valuedisplay'
    ww_behaviorlist = "ww_valuedisplay"
    <v:rect
        id          = 'rect1_object'
        <Behavior
            id          = 'rect1_valuedisplay'
            ww_type     = 'wwvaluedisplay'
            ww_actionType = 'ValueDisplayAnalog'>
        </Behavior>
    </v:rect>
</v:group> <!-- rect1 -->
```

Note: If this is a text or button object then there will also be a ww_format attribute that dictates how the new value should be displayed.

Text Object:

```
<v:group class=wwanim id=text37
    w_object="text37_object"
    ww_type="wwText"
    ww_format = 'Value = ###.00.'>
    <v:shape id=text37_shape>
        <DIV id=text37_object>
        </DIV>
    </v:shape>
    <BEHAVIOR id=text37_valuedisplay>
    </BEHAVIOR>
</v:group>
```

Button Object:

```
<v:group id=button9 ww_type="WWButton"
    ww_format = 'Value = ###.00.'
    <v:rect id=button9_enclosing_rect
        <v:textbox>
            <BUTTON id=button9_object >
            </BUTTON>
        </v:textbox>
        <BEHAVIOR id=button9_touchlink ww_type="wwtouchlink"
        </BEHAVIOR>
    </v:rect>
</v:group>
```

Example Binding Expression in the Data Binding Table.

```
<BindingExpression
    TargetElement    = "rect1"
    BehaviorMethod   = "ValueDisplayAnalog"
    TagExpressionOrg = "Analog_tag"
    TagExpression    = "var1"
    ReadWrite        = "false"
    IsExpression     = "false">
    <ExpressionTags>
        <Tag
            Item    = "Analog_tag"
            VarName = "var1"
            ConnID  = "1">
        </Tag>
    </ExpressionTags>
</BindingExpression>
```

566 Value Display—String

```
<v:group
    class           = 'wwanim'
    id              = 'rect1'
    ww_type         = 'WWRectangle'
    ww_object       = 'rect1_object'
    ww_valuedisplay = 'rect1_valuedisplay'
    ww_behaviorlist = "ww_valuedisplay"
    <v:rect
        id          = 'rect1_object'
        <Behavior
            id          = 'rect1_valuedisplay'
            ww_type     = 'wwvaluedisplay'
            ww_actionType = 'ValueDisplayString'>
        </Behavior>
    </v:rect>
</v:group> <!-- rect1 -->
```

Example Binding Expression in the Data Binding Table.

```
<BindingExpression
    TargetElement    = "rect1"
    BehaviorMethod   = "ValueDisplayString"
    TagExpressionOrg = "String_tag"
    TagExpression    = "var1"
    ReadWrite        = "false"
    IsExpression     = "false">
    <ExpressionTags>
        <Tag
            Item    = "String_tag"
            VarName = "var1"
            ConnID  = "1">
        </Tag>
    </ExpressionTags>
</BindingExpression>
```

568 Text Box Window Control

```
<v:group
    class           = wwanim
    id              = TextBox_3_Group
    style           = "CURSOR: hand; HEIGHT: 51px; MARGIN-LEFT: 9px;
                       MARGIN-TOP: 199px; POSITION: absolute; WIDTH: 120px"
    Title           = TextBox_3
    ww_behaviorlist = "ww_windowcontrol"
    ww_object       = "TextBox_3"
    ww_stroke       = "TextBox_3_stroke"
    ww_type         = "WCTEXTBOX"
    coordsize       = "21600,21600">
    <v:rect
        style       = "HEIGHT: 21600px; MARGIN-LEFT: 0px; MARGIN-TOP: 0px;
                       POSITION: absolute; WIDTH: 21600px"
        coordsize   = "21600,21600"
```

```
        filled           = "f"
        stroked          = "f">
    <v:textbox
        inset = "0,0,0,0">
        <TEXTAREA
            id       = TextBox_3
            style    = "HEIGHT: 100%; OVERFLOW: hidden; POSITION: absolute;
                        WIDTH: 100%"
            Wrap     = hard
            TAGNAME  = "string_tag"
            MAXLENGTH = "5">
            Value 1
        </TEXTAREA>
    </v:textbox>
  </v:rect>
</v:group>
```

Note: For Textbox's that do not have the multi-line option enabled an <INPUT> tag is used instead of the <TEXTAREA> tag as shown below.

```
<v:group
    class            = wwanim
    id               = TextBox_5_Group
    style            = "HEIGHT: 80px; MARGIN-LEFT: 30px; MARGIN-TOP: 40px;
                        POSITION: absolute; WIDTH: 120px"
    title            = TextBox_5
    ww_behaviorlist  = "ww_windowcontrol"
    ww_object        = "TextBox_5"
    ww_stroke        = "TextBox_5_stroke"
    ww_type          = "WCTEXTBOX"
    coordsize        = "21600,21600">
    <v:rect
        style        = "HEIGHT: 21600px; MARGIN-LEFT: 0px; MARGIN-TOP: 0px;
                        POSITION: absolute; WIDTH: 21600px"
        coordsize    = "21600,21600"
        filled       = "f"
        stroked      = "f">
        <v:textbox
            inset = "0,0,0,0">
            <INPUT
                id        = TextBox_5
                maxLength = 131
                style     = "HEIGHT: 100%; OVERFLOW: hidden; POSITION: absolute;
                             WIDTH: 100%"
                TAGNAME   = "">
        </v:textbox>
    </v:rect>
</v:group>
```

Example Binding Expression in the Data Binding Table.

```
<BindingExpression
    TargetElement     = "TextBox_3_Group"
    BehaviorMethod    = "WindowControlValue"
    TagExpressionOrg  = "String_tag"
    TagExpression     = "var1"
    ReadWrite         = "false"
    IsExpression      = "false">
    <ExpressionTags>
        <Tag
            Item     = "String_tag"
            VarName  = "var1"
            ConnID   = "1">
        </Tag>
    </ExpressionTags>
</BindingExpression>
```

570 Checkbox Window Control

```
<v:group
    class=wwanim
    id=CheckBox_1_Group
    style            = "HEIGHT: 51px;
                        MARGIN-LEFT: 9px;
                        MARGIN-TOP: 259px;
                        POSITION: absolute;
                        WIDTH: 151px"
    Title            = CheckBox_1
    ww_behaviorlist  = "ww_windowcontrol"
    ww_object        = "CheckBox_1"
    ww_stroke        = "CheckBox_1_stroke"
    ww_type          = "WCCHECKBOX"
    coordsize        = "21600,21600">
    <v:rect
        style        = "HEIGHT: 21600px;
                        MARGIN-LEFT: 0px;
                        MARGIN-TOP: 0px;
                        POSITION: absolute;
                        WIDTH: 21600px"
```

-continued

```
        coordsize       = "21600,21600"
        filled          = "f"
        stroked         = "f">
        <v:textbox
            inset = "0,0,0,0">
            <INPUT CHECKED
                id          = CheckBox_1
                type        = checkbox
                TAGNAME     = "discrete_tag">
                CheckBox stuff
            </INPUT>
        </v:textbox>
    </v:rect>
</v:group>
```

Example Binding Expression in the Data Binding Table.

```
<BindingExpression
    TargetElement       = "CheckBox_1_Group"
    BehaviorMethod      = "WindowControlValue"
    TagExpressionOrg    = "String_tag"
    TagExpression       = "var1"
    ReadWrite           = "false"
    IsExpression        = "false">
    <ExpressionTags>
        <Tag
            Item        = "String_tag"
            VarName     = "var1"
            ConnID      = "1">
        </Tag>
    </ExpressionTags>
</BindingExpression>
```

572 Listbox Window Control

```
<v:group
    class           = wwanim
    id              = ListBox_2_Group
    style           = "CURSOR: hand;
                      HEIGHT: 80px;
                      MARGIN-LEFT: 9px;
                      MARGIN-TOP: 9px;
                      POSITION: absolute;
                      WIDTH: 120px"
    Title           = ListBox_2
    ww_behaviorlist = "ww_windowcontrol"
    ww_object       = "ListBox_2"
    ww_stroke       = "ListBox_2_stroke"
    ww_type         = "WCLISTBOX"
    coordsize       = "21600,21600">
    <v:rect
        style       = "HEIGHT: 21600px;
                      MARGIN-LEFT: 0px;
                      MARGIN-TOP: 0px;
                      POSITION: absolute;
                      WIDTH: 21600px"
        coordsize   = "21600,21600"
        filled      = "f"
        stroked     = "f">
        <v:textbox
            inset   = "0,0,0,0">
            <SELECT
                id          = ListBox_2
                multiple
                style       = "HEIGHT: 100%;
                              POSITION: absolute;
                              WIDTH: 100%"
                DUPLICATE   = "true"
                SORTED      = "true"
                TAGNAME     = "string_tag">
                <OPTION selected>
                    Value 1
                </OPTION>
```

-continued

```
                <OPTION>
                    Value 8
                </OPTION>
                <OPTION>
                    Value 7
                </OPTION>
                <OPTION>
                    Value 1
                </OPTION>
            </SELECT>
        </v:textbox>
    </v:rect>
</v:group>
```

Example Binding Expression in the Data Binding Table.

```
<BindingExpression
    TargetElement       = " ListBox_2_Group"
    BehaviorMethod      = "WindowControlValue"
    TagExpressionOrg    = "String_tag"
    TagExpression       = "var1"
    ReadWrite           = "false"
    IsExpression        = "false">
    <ExpressionTags>
        <Tag
            Item        = "String_tag"
            VarName     = "var1"
            ConnID      = "1">
        </Tag>
    </ExpressionTags>
</BindingExpression>
```

574 Combobox Window Control

```
<v:group
    class           = wwanim
    id              = ComboBox_3_Group
    style           = "CURSOR: hand;
                      HEIGHT: 80px;
                      MARGIN-LEFT: 9px;
                      MARGIN-TOP: 109px;
                      POSITION: absolute;
                      WIDTH: 120px"
    Title           = ComboBox_3
    ww_behaviorlist = "ww_windowcontrol"
    ww_object       = "ComboBox_3"
    ww_stroke       = "ComboBox_3_stroke"
    ww_type         = "WCCOMBOBOX"
    coordsize       = "21600,21600">
    <v:rect
        style       = "HEIGHT: 21600px;
                      MARGIN-LEFT: 0px;
                      MARGIN-TOP: 0px;
                      POSITION: absolute;
                      WIDTH: 21600px"
    coordsize   = "21600,21600"
    filled      = "f"
    stroked     = "f">
    <v:textbox
        inset   = "0,0,0,0">
        <SELECT
            id          = ComboBox_3
            style       ="HEIGHT: 100%;
                         POSITION: absolute;
                         WIDTH: 100%"
            DUPLICATE   = "false"
            SORTED      = "true"
            TAGNAME     = "string_tag"
            LISTSTYLE   = "1"
            MAXLENGTH   = "131">
            <OPTION>
                Value is good
            </OPTION>
```

```
            <OPTION>
                Value 31
            </OPTION>
            <OPTION>
                Value 11
            </OPTION>
            <OPTION>
                Value 1
            </OPTION>
        </SELECT>
    </v:textbox>
  </v:rect>
</v:group>
```

Example Binding Expression in the Data Binding Table.

```
   <BindingExpression
        TargetElement      = " ComboBox_3_Group"
        BehaviorMethod     = "WindowControlValue"
        TagExpressionOrg   = "String_tag"
        TagExpression      = "var1"
        ReadWrite          = "false"
        IsExpression       = "false">
        <ExpressionTags>
            <Tag
                Item       = "String_tag"
                VarName    = "var1"
                ConnID     = "1">
            </Tag>
        </ExpressionTags>
   </BindingExpression>
```

576 Radiobutton Window Control

```
<v:group
    class           = wwanim
    id              = RadioButtonGroup_2_Group
    style           = "HEIGHT: 90px; MARGIN-LEFT: 49px; MARGIN-TOP: 26px;
                       POSITION: absolute; WIDTH: 120px"
    Title           = RadioButtonGroup_2
    TAGNAME         = "analog_tag"
    ww_behaviorlist = "ww_windowcontrol"
    ww_object       = "RadioButtonGroup_2"
    ww_stroke       = "RadioButtonGroup_2_stroke"
    ww_type         = "WCRADIOBUTTONGROUP"
    coordsize       = "21600,21600">
    <v:rect
        style       = "HEIGHT: 21600px; MARGIN-LEFT: 0px; MARGIN-TOP: 0px;
                       POSITION: absolute; WIDTH: 21600px"
        coordsize   = "21600,21600"
        filled      = "f"
        stroked     = "f">
        <v:textbox
            id      = RadioButtonGroup_2
            type    = "radiogroup"
            inset   = "0,0,0,0">
            <TABLE height="100%" width="100%">
                <TBODY>
                    <TR>
                        <TD>
                            <INPUT
                                id    = RadioButtonGroup_2_button
                                name  = RadioButtonGroup_2
                                type  = radio
                                value = Caption1>Caption1
                            </INPUT>
                        </TD>
                    </TR>
                    <TR>
                        <TD>
                            <INPUT
                                id    = RadioButtonGroup_2_button
                                name  = RadioButtonGroup_2
                                type  = radio
                                value = Caption2>Caption2
                            </INPUT>
                        </TD>
                    </TR>
                </TBODY>
            </TABLE>
        </v:textbox>
    </v:rect>
</v:group>
```

Example Binding Expression in the Data Binding Table.

```
<BindingExpression
    TargetElement      = "RadioButtonGroup_7_Group"
    BehaviorMethod     = "WindowControlValue"
    TagExpressionOrg   = "String_tag"
    TagExpression      = "var1"
    ReadWrite          = "false"
    IsExpression       = "false">
    <ExpressionTags>
        <Tag
            Item       = "String_tag"
            VarName    = "var1"
            ConnID     = "1">
        </Tag>
    </ExpressionTags>
</BindingExpression>
```

Symbols with Animation Behavior

The XSL transformation for symbols is important to the Animation Component. The Animation Component checks to see if the "ww_type" attribute is equal to "wwSymbol". If it is then the Animation Component knows that it contains two or more child UI objects that must all be involved in the animation behavior(s) bound to the symbol. The XSL generated output below shows a symbol consisting of two round rectangle objects and having an analog fill color animation behavior attached to it. Notice that the animation behavior is referenced (ww_Fillcolor="symbol7_Fillcolor") in the symbol group, not on each UI object. This is because animation behaviors must be attributes of the element that has the animation behavior bound to it (class=wwanim).

```
<v:group
    class            = wwanim
    id               = symbol7
    ww_Fillcolor     = "symbol7_Fillcolor"
    ww_behaviorlist  = "ww_fillcolor"
    ww_object        = "symbol7_object"
    ww_type          = "WWSymbol">
    <v:group
        id           = rrect1
        style        = "MARGIN-LEFT: 1px;
                       MARGIN-TOP:1px;"
        ww_object    = "rrect1_object"
        ww_type      = "WWRoundRectangle"
        <v:roundrect
            id       = rrect1_object
            Fill     = "true"
            fillcolor = "#83ffff"
        </v:roundrect>
    </v:group>
    <v:group
        id           = rrect2
        style        = "MARGIN-LEFT: 21px;
                       MARGIN-TOP:21px;"
        title        = rrect2
        ww_object    = "rrect2_object"
        ww_type      = "WWRoundRectangle">
        <v:roundrect
            id       = rrect2_object
            fillcolor = "#83ffff" >
        </v:roundrect>
    </v:group>
    <BEHAVIOR
        id               = symbol7_Fillcolor
        ww_type          = "wwFillcolor"
        ww_color5        = "rgb( 191, 255, 191 )"
        ww_color4        = "rgb( 186, 0, 186 )"
        ww_color3        = "rgb( 0, 0, 255 )"
        ww_color2        = "rgb( 255, 255, 255 )"
        ww_color1        = "rgb( 186, 186, 0 )"
        ww_breakpoint4   = "50.000000"
        ww_breakpoint3   = "40.000000"
        ww_breakpoint2   = "30.000000"
        ww_breakpoint1   = "20.000000"
        ww_actionType    = "FillColorAnalog">
    </BEHAVIOR>
</v:group>
```

Example Binding Expression in the Data Binding Table.

```
<BindingExpression
    TargetElement      = "symbol7"
    BehaviorMethod     = "FillColorAnalog"
    TagExpressionOrg   = "$Second"
    TagExpression      = "var0"
    IsExpression       = "false">
    <ExpressionTags>
        <Tag
            Item       = "$Second"
            VarName    = "var0"
            ConnID     = "1">
        </Tag>
    </ExpressionTags>
</BindingExpression>
```

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A method for presenting animated graphics on a browser client based upon an animated process graphic display object specification from a remote server and runtime process parameter data separate from the animated process graphic display object specification, the runtime process parameter data affecting an appearance trait of an object instance created from the animated process graphic display object specification, the method comprising the steps of receiving, by the client, an animated graphics view description from the remote server, the animated graphics view description containing a plurality of animated graphics object instance definitions, each animated graphics object instance definition specifying:

an animation behavior, and a source of streaming runtime process data represented on a data server;

creating a plurality of animated process graphical display objects corresponding to the plurality of animated graphics object instance definitions for the animated graphics view;

creating a connection between the plurality of animated process graphical display objects for the animated graphics view and a source of streaming runtime process data maintained on the data server, wherein runtime data from the data server affects display, within the animated graphics view, of the plurality of animated process graphical display objects; and applying the runtime data, received from the source of runtime data maintained on the data server, to the animated process graphical display objects to render an animated view containing the plurality of animated process graphical display objects.

2. The method of claim 1 wherein the animated graphics view description is rendered at least in part in a generic programming format.

3. The method of claim 2 wherein the generic programming format is XML.

4. The method of claim 1 wherein the runtime data comprises manufacturing/process control system status information.

5. The method of claim 1 wherein the animated graphics view description for an animated process graphical display object specifies a particular type of animation behavior method called to handle a change to a runtime data value associated with the animated process graphical display object.

6. The method of claim 5 wherein the animated graphics view description comprises an expression, wherein the expression includes the runtime data value as an input, and wherein the output of the expression is utilized to drive a display parameter of the animated process graphical display object.

7. The method of claim 1 wherein the creating a connection step comprises establishing a connection wherein changes to a parameter value associated with the animated process graphical display object are communicated from the client to a remote runtime database via the server.

8. The method of claim 1 wherein the server is associated with the data server that receives and stores real-time process data generated by a manufacturing/process control system.

9. The method of claim 8 wherein the creating a connection step comprises enumerating a runtime parameter to watch on the server for purposes of updating the animated view of one of the plurality of animated process graphical display objects.

10. The method of claim 8 wherein the real-time process data is provided via a data access server interposed between the server and process control equipment.

11. A system for presenting animated graphics on a networked client machine based upon an animated process graphic display object specification from a server and runtime process parameter data separate from the animated process graphic display object specification, the runtime process parameter data affecting an appearance trait of an object instance created from the animated process graphic display object specification, the system comprising a client machine including executable instructions for facilitating performing the steps of:

receiving, by the client, an animated graphics view description from the server, the animated graphics view description containing a plurality of animated graphics object instance definitions, each animated graphics object instance definition specifying:
an animation, and
a source of streaming runtime process data;
creating a plurality of animated process graphical display objects, corresponding to the plurality animated graphics object instance definitions for the animated graphics view;
creating a connection between the plurality of animated process graphical display objects for the animated graphics view and a source of runtime data maintained on a data server, wherein runtime data from the data server affects display, within the animated graphics view, of the plurality of animated process graphical display objects; and
applying the runtime data, received from the source of runtime data maintained on the data server, to the animated process graphical display objects to render an animated view containing the plurality of animated process graphical display objects.

12. The system of claim 11 wherein the animated graphics view description is rendered at least in part in a generic programming format.

13. The system of claim 12 wherein the generic programming format is XML.

14. The system of claim 11 further comprising a portal server machine that provides, to the client machine, the animated graphics view description and real-time process data that drives animated behavior of the animated process graphical display objects created from the animated graphics description.

15. The system of claim 11 wherein the animated graphics view description for an animated process graphical display object specifies a particular type of animation behavior method called to handle a change to a runtime data value associated with the animated process graphical display object.

16. The system of claim 15 wherein the animated graphics view description comprises an expression, wherein the expression includes the runtime data value as an input, and wherein the output of the expression is utilized to drive a display parameter of the animated process graphical display object.

17. The system of claim 11 further comprising a connection created during the creating a connection step, and wherein changes to a parameter value associated with the animated process graphical display object are communicated from the client to a remote runtime database via the connection.

18. The system of claim 11 wherein the server is associated with the data server that receives and stores real-time process data generated by a manufacturing/process control system.

19. The system of claim 18 further comprising a connection data structure, maintained by the client machine, and wherein the connection data structure is updated in accordance with the creating a connection step to map a runtime parameter on the data server to the animated process graphical display object for purposes of updating the animated view of one of the plurality of animated process graphical display objects in response to changes to a value of the runtime parameter.

20. The system of claim 18 wherein the real-time process data is provided via a data access server interposed between the server and process control equipment.

21. A non-transient computer-readable medium including computer-executable instructions for presenting animated graphics on a client based upon an animated process graphic display object specification from a server and runtime process parameter data separate from the animated process graphic display object specification, the runtime process parameter data affecting an appearance trait of an object instance created from the animated process graphic display object specification, the computer-executable instructions facilitating performing the steps of:

receiving, by the client, an animated graphics view description from the server, the animated graphics view description containing a plurality of animated graphics object instance definitions, each animated graphics object instance definition specifying:
an animation, and
a source of streaming runtime process data;
creating a plurality of animated process graphical display objects, corresponding to the plurality animated graphics object instance definitions for the animated graphics view;

creating a connection between the plurality of animated process graphical display objects for the animated graphics view and a source of runtime data maintained on a data server, wherein runtime data from the data server affects display, within the animated graphics view, of the plurality of animated process graphical display objects; and applying the runtime data, received from the source of runtime data maintained on the data server, to the animated process graphical display objects to render an animated view containing the plurality of animated process graphical display objects.

22. The non-transient computer-readable medium of claim 21 wherein the animated graphics view description is rendered at least in part in a generic programming format.

23. The non-transient computer-readable medium of claim 22 wherein the generic programming format is XML.

24. The non-transient computer-readable medium of claim 21 wherein the runtime data comprises manufacturing/process control system status information.

25. The non-transient computer-readable medium of claim 21 wherein the animated graphics description for an animated process graphical display object specifies a particular type of animation behavior method called to handle a change to a runtime data value associated with the animated process graphical display object.

26. The non-transient computer-readable medium of claim 25 wherein the animated graphics view description comprises an expression, wherein the expression includes the runtime data value as an input, and wherein the output of the expression is utilized to drive a display parameter of the animated process graphical display object.

27. The non-transient computer-readable of claim 21 wherein the creating a connection step comprises establishing a connection wherein changes to a parameter value associated with the animated process graphical display object are communicated from the client to a remote runtime database via the server.

* * * * *